US009459163B2

(12) United States Patent
Sirbuly et al.

(10) Patent No.: US 9,459,163 B2
(45) Date of Patent: Oct. 4, 2016

(54) ULTRA-SENSITIVE FORCE SENSING BASED ON EVANESCENT LIGHT

(71) Applicant: The Regents of the University of California, Oakland, CA (US)

(72) Inventors: Donald J. Sirbuly, Carlsbad, CA (US); Sadik C. Esener, Solana Beach, CA (US); Ilsun Yoon, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 14/762,792

(22) PCT Filed: Jan. 22, 2014

(86) PCT No.: PCT/US2014/012621
§ 371 (c)(1),
(2) Date: Jul. 22, 2015

(87) PCT Pub. No.: WO2014/116758
PCT Pub. Date: Jul. 31, 2014

(65) Prior Publication Data
US 2015/0355040 A1 Dec. 10, 2015

Related U.S. Application Data

(60) Provisional application No. 61/755,436, filed on Jan. 22, 2013.

(51) Int. Cl.
*G01N 21/00* (2006.01)
*G01L 1/24* (2006.01)
(52) U.S. Cl.
CPC ............... *G01L 1/243* (2013.01); *G01L 1/242* (2013.01)
(58) Field of Classification Search
CPC ......... G01M 11/3145; G01M 11/335; G01M 11/33; G01M 11/3109; G01M 11/338

USPC ........................................................ 356/73.1
See application file for complete search history.

(56) References Cited

U.S. PATENT DOCUMENTS 4,945,245 A  7/1990 Levin
5,091,983 A  2/1992 Lukosz
(Continued)

FOREIGN PATENT DOCUMENTS

EP   0377549 A2   7/1990

OTHER PUBLICATIONS

Ashkin, A. Acceleration and Trapping of Particles by Radiation Pressure. Phys. Rev. Left. 24, 156-159 (1970).
(Continued)

*Primary Examiner* — Tarifur Chowdhury
*Assistant Examiner* — Md M Rahman
(74) *Attorney, Agent, or Firm* — Perkins Coie LLP

(57) ABSTRACT

Methods, structures, devices and systems are disclosed for implementing a fiber optic force sensing transducer. In one aspect, an exemplary fiber optic force sensing transducer device includes an optical fiber coated by at least one layer of a polyelectrolyte material that utilizes the movement of optical structures coupled to the external polyelectrolyte layer in an evanescent field produced by the optical fiber to detect forces imposing on the fiber. In one aspect, an optical sensing device includes an optical waveguide that internally guides light, one or more layers formed outside the optical waveguide within an evanescent field of the guided light in the optical waveguide, and one or more optical structures coupled to the one or more layers in the evanescent field to emit light based on interaction with the evanescent field to indicate a position of an optical structure relative to an external surface of the optical waveguide.

41 Claims, 15 Drawing Sheets

(56) References Cited

U.S. PATENT DOCUMENTS

| | | | |
|---|---|---|---|
| 7,492,978 B2* | 2/2009 | Zourob | G01N 21/648 385/12 |
| 2006/0093272 A1 | 5/2006 | Fenwick et al. | |
| 2006/0147147 A1* | 7/2006 | Zourob | G01N 21/648 385/12 |
| 2009/0128495 A1* | 5/2009 | Kong | G02B 6/0033 345/170 |
| 2010/0207411 A1 | 8/2010 | Sun et al. | |
| 2012/0273662 A1 | 11/2012 | Caldwell et al. | |
| 2012/0298849 A1* | 11/2012 | He | G01D 5/35319 250/227.14 |

OTHER PUBLICATIONS

Ashkin, A., Dziedzic, J. M., Bjorkholm, J. E. & Chu, S. Observation of a single-beam gradient force optical trap for dielectric particles. Opt. Lett. 11, 288-290 (1986).
Barbey, R., Lavanant, L., Paripovic, D., Schuwer, N., Sugnaux, C., Tugulu, S. & Klok, H. A. Polymer brushes via surface-initiated controlled radical polymerization: Synthesis, characterization, properties, and applications. Chem. Rev. 109, 5437-5527 (2009).
Barnes, W. L., Dereux, A. & Ebbesen, T. W. Surface plasmon subwavelength optics. Nature 424, 824-830 (2003).
Barrelet, C. J., Greytak, A. B. & Lieber, C. M. Nanowire photonic circuit elements. Nano Lett. 4, 1981-1985 (2004).
Barth, S., Harnagea, C., Mathur, S. & Rosei, F. The elastic moduli of oriented tin oxide nanowires. Nanotechnol. 20, 115705 (2009).
Bausch, A. R.; Moller, W.; Sackmann, E. "Measurement of Local Viscoelasticity and Forces in Living Cells by Magnetic Tweezers", Biophys. J. 1999, 76, 573-579.
Bedja, I., Kamat, P. V. & Hotchandani, S. Fluorescence and photoelectrochemical behavior of chlorophyll a adsorbed on a nanocrystalline SnO2 film. J. Appl. Phys. 80, 4637-4643 (1996).
Binnig, G., Quate, C. F. & Gerber, C. Atomic force microscope. Phys. Rev. Lett. 56, 930-933 (1986).
Bucaro, J. A. & Hickman, T. R. Measurement of sensitivity of optical fibers for acoustic detection. Appl. Opt. 18, 938-940 (1979).
Bucaro, J. A., Dardy, H. D. & Carome, E. F. Fiberoptic hydrophone. J. Acous. Soc. of Am. 62, 1302-1304 (1977).
Bustamante, C., Macosko, J. C. & Wuite, G. J. L. Grabbing the cat by the tail: Manipulating molecules one by one. Nature Rev. Mol. Cell Biol. 1, 130-136 (2000).
Carnahan, M. A., Middleton, C., Kim, J., Kim, T. & Grinstaff, M. W. Hybrid dendritic-linear polyester-ethers for in situ photopolymerization. J. Am. Chem. Soc. 124, 5291-5293 (2002).
Caruso, F., Lichtenfield, H., Donath, E & Möhwald, H. "Investigation of Electrostatic Interactions in Polyelectrolyte Multilayer Films: Binding of an Anionic Fluorescent Probes to Layers Assembled onto Colloids", Macromol. 32, 2317 (1999).
Clausen-Schaumann, H., Seitz, M., Krautbauer, R. & Gaub, H. E. Force spectroscopy with single bio-molecules. Curr. Opin. Chem. Biol. 4, 524-530 (2000).
Comyn, J., "Polymer permeability", British Polymer Journal, vol. 18, No. 3, 1986, pp. 209-210.
Copenheaver, B.R., Authorized Officer, International Search Authority/US, International Search Report, International Application No. PCT/US2014/012621, May 14, 2014, 15 pages.
Cross, S. E.; Jin, Y. S.; Rao, J.; Gimzewski, J. K, "Nanomechanical analysis of cells from cancer patients", Nature Nanotechnol. 2007, 2, 780-783.
Decher, G., Hong, J. D. & Schmitt, J. Buildup of ultrathin multilayer films by a self-assembly process: III. Consecutively alternating adsorption of anionic and cationic polyelectrolytes on charged surfaces. Thin Solid Films 210, 831-835 (1992).
Deng, L., Mrksich, M. & Whitesides, G. M. Self-assembled monolayers of alkanethiolates presenting tri(propylene sulfoxide) groups resist the adsorption of protein. J. Am. Chem. Soc. 118, 5136-5137 (1996).

Devasenathipathy, S., Santiago, J. G., Wereley, S. T., Meinhart, C. D. & Takehara, K. Particle imaging techniques for microfabricated fluidic systems. Exp. Fluids 34, 504-514 (2003).
du Roure, O. et al. Force mapping in epithelial cell migration. Proc. Natl. Acad. Sci. U.S.A. 102, 2390-2395 (2005).
Florin, E. L., Moy, V. T. & Gaub, H. E. Adhesion forces between individual ligan-receptor pairs. Science 264, 415-417 (1994).
Zieglschmid, V.; Hollmann, C.; Bocher, O., "Detection of Disseminated Tumor Cells in Peripheral Blood", Crit. Rev. Clin. Lab. Sci. 2005, 42, 155-196.
Zhuang, X. W. et al. A single-molecule study of RNA catalysis and folding. Science 288, 2048-2051 (2000).
Forch, R., Chifen, A. N., Bousquet, A., Khor, H. L., Jungblut, M., Chu, L. Q., Zhang, Z., Osey-Mensah, I., Sinner, E. K. & Knoll, W. Recent and expected roles of plasma-polymerized films for biomedical applications. Chem. Vapor Dep. 13, 280-294 (2007).
Gramotnev, D. K. & Bozhevolnyi, S. I. Plasmonics beyond the diffraction limit. Nature Photonics 4, 83-91, doi:10.1038/nphoton.2009.282 (2010).
Guck, J.; Schinkinger, S.; Lincoln, B.; Wottawah, F.; Ebert, S.; Romeyke, M.; Lenz, D.; Erickson, H. M.; Ananthakrishnan, R.; Mitchell, D.; Kas, J.; Ulvick, S.; Bilby, C. Biophys. J. 2005, 88, 3689-3698.
Harder, P., Grunze, M., Dahint, R., Whitesides, G. M. & Laibinis, P. E. Molecular conformation in oligo(ethylene glycol)-terminated self-assembled monolayers on gold and silver surfaces determines their ability to resist protein adsorption. J. Phys. Chem. B 102, 426-436 (1998).
Yoon, I., Kim, K., Baker, S., Heineck, D., Esener, S. & Sirbuly, D. J. Stimulus-responsive light coupling and modulation with nanofiber waveguide junctions, Nano Lett., 2012, 12, 1905-1911.
Yildiz, A. et al. Myosin V walks hand-over-hand: Single fluorophore imaging with 1.5-nm localization. Science 300, 2061-2065 (2003).
Hill, C., Corbett, C. & Rose, A. Why so few? Women in science, technology, engineering, and mathematics, AAUW, 2010, 134 pages.
Hohng, S. et al. Fluorescence-force spectroscopy maps two-dimensional reaction landscape of the Holliday junction. Science 318, 2007, 279-283.
Holmberg, K., Bergstrom, K., Brink, C., Osterberg, E., Tiberg, F. & Harris, J. M. Effects on protein adsorption, bacterial adhesion and contact angle of grafting PEG chains to polystyrene. J. Adhes. Sci. Technol. 7, 1993, 503-517.
Huang, Y., Duan, X. F., Wei, Q. Q. & Lieber, C. M. Directed assembly of one-dimensional nanostructures into functional networks. Science 291, 630-633 (2001).
Huntington, S. T. & Ladouceur, F. Evanescent fields—Direct measurement, modeling, and application. Micro. Res. Technique 70, 2007, 181-185.
Hurst, S. J.; Lytton-Jean, A. K. R.; Mirkin, C. A., "Maximizing DNA Loading on a Range of Gold Nanoparticle Sizes", Anal. Chem. 2006, 78, 8313-8318.
Ye, Z., Hu, X., Li, M., Ho, K.-M. & Yang, P. Propagation of guided modes in curved nanoribbon waveguides. Appl. Phys. Lett. 89, 2006, 4 pages.
Kedrov, A., Janovjak, H., Sapra, K. T. & Mueller, D., "Deciphering Molecular Interactions of Native Membrane Proteins by Single-Molecule Force Spectroscopy", J. Annu. Rev. Biophys. Biomol. Struct. 36, 2007, 233-260.
Knight, M. W., Wu, Y., Lassiter, J. B., Nordlander, P. & Halas, N. J. Substrates matter: Influence of an adjacent dielectric on an individual plasmonic nanoparticle. Nano Lett. 9, 2009, 2188-2192.
Lan C. Y. Ding, Q. P. Jiang, Y. W. Huang, H. B. & Yang, S. G. Optical coupling between two nanobelts. Phys. Lett. A 373, 2009, 2061-2064.
Lee, J. N., Park, C. & Whitesides, G. M. Solvent compatibility of poly(dimethylsiloxane)-based microfluidic devices. Anal. Chem. 75, 2003, 6544-6554.
Lim, T. K., Zhou, Y., Lin, Y. Yip, Y. M. & Lam, Y. L. Fiber optic acoustic hydrophone with double Mach-Zehnder interferometers for optical path length compensation. Opt. Comm. 159, 1999, 301-308.

(56) References Cited

OTHER PUBLICATIONS

Ma, H., Jen, A. K. Y. & Dalton, L. R. Polymer-based optical waveguides: Materials, processing, and devices. Adv. Mater. 14, 2002, 1339-1365.

Malmsten, M., Lassen, B., Holmberg, K., Thomas, V. & Quash, G. Effects of hydrophilization and immobilization on the interfacial behavior of immunoglobulins. J. Colloid Interface Sci. 177, 1996, 70-78.

Yang, Z. H., Galloway, J. A. & Yu, H. U. Protein interactions with poly(ethylene glycol) self-assembled monolayers on glass substrates: Diffusion and adsorption. Langmuir 15, 1999, 8405-8411.

Moffitt, J. R., Chemla, Y. R., Smith, S. B. & Bustamante, C. Recent advances in optical tweezers. Annu. Rev. Biochem. 77, 205-228 (2008).

Neuman, K. C. & Nagy, A. Single-molecule force spectroscopy: optical tweezers, magnetic tweezers and atomic force microscopy. Nature Methods 5, 491-505 (2008).

Nirmal, M. et al. Fluorescence intermittency in single cadmium selenide nanocrystals. Nature 383, 802-804 (1996).

Wu, Y. P. & Nordlander, P. Finite-difference time-domain modeling of the optical properties of nanoparticles near dielectric substrates. J. Phys. Chem. C 114, 7302-7307 (2010).

Yan, B. et al. Single-crystalline V2O5 ultralong nanoribbon waveguides. Adv. Mater. 21, 2436-2440 (2009).

Wu, H. C., Huang, Y. C., Ding, I. K., Chen, C. C., Yang, Y. H., Tsai, C. C., Chen, C. D. & Chen, Y. T. Photoinduced electron transfer in dye-sensitized SnO2 nanowire field-effect transistors. Adv. Fund. Mater 21, 474-479 (2011).

Ostaci, R. V., Damiron, D., Grohens, Y., Leger, L. & Drockenmuller, E. Click chemistry grafting of poly(ethylene glycol) brushes to alkyne-functionalized pseudobrushes. Langmuir 26, 1304-1310 (2010).

Pan, Z. W; Dai, Z. R.; Wang, Z. L, Nanobelts of Semiconducting Oxides, Science 2001, 291, 1947-1949.

Papra, A., Gadegaard, N. & Larsen, N. B. Characterization of ultrathin poly(ethylene glycol) monolayers on silicon substrates. Langmuir 17, 1457-1460 (2001).

Pauzauskie, P. J., Radenovic, A., Trepagnier, E., Shroff, H., Yang, P. D. & Liphardt, J. Optical trapping and integration of semiconductor nanowire assemblies in water. Nature Mater 5, 97-101, doi:10.1038/nmat1563 (2006).

Nhang, D., Jin, S., Wu, Y. & Lieber, C. M. Large-scale hierarchical organization of nanowire arrays for integrated nanosystems. Nano Lett. 3, 1255-1259 (2003).

Popat, K. C. & Desai, T. A. Poly(ethylene glycol) interfaces: an approach for enhanced performance of microfluidic system& Biosens. Bioelectron. 19, 1037-1044 (2004).

Riccardi, C., Roman, H. E. & Ziano, R. Attachment of polymer chains on plasma-treated surfaces: experiments and modeling. New J. Phys. 12, 059502 (2010).

Rutkowski, C. A., Williams, L. M., Haines, T. H. & Cummins, H. Z. The elasticity of synthetic phospholipid-vesicles obtained by photon-correlation spectrocopy. Biochem. 30, 5688-5696 (1991).

Santiago, J. G., Wereley, S. T., Meinhart, C. D., Beebe, D. J. & Adrian, R. J. A particle image velocimetry system for microfluidics. Exp. Fluids 25, 316-319 (1998).

Weiss, S. Fluorescence spectroscopy of single biomolecules. Science 283, 1676-1683 (1999).

Sharma, S., Johnson, R. W. & Desai, T. A. Evaluation of the stability of nonfouling ultrathin poly(ethylene glycol) films for silicon-based microdevices. Langmuir 20, 348-356 (2004).

Sharma, S. & Desai, T. A., XPS and AFM analysis of antifouling PEG interfaces for microfabricated silicon biosensors, Biosensors and Bioelectronics 20 (2004) pp. 227-239.

Sirbuly, D. J. et al. Biofunctional subwavelength optical waveguides for biodetection. ACS Nano 2, 255-262 (2008).

Sirbuly, D. J., Law, M., Johnson, J. C., Goldberger, J., Saykally, R. J. & Yang, P. D. Nanoribbon waveguides for subwavelength photonics integration. Science 305, 1269-1273 (2004).

Sirbuly, D. J., Law, M., Pauzauskie, P., Yan, H. Q., Maslov, A. V., Knutsen, K., Ning, C. Z., Saykally, R. J. & Yang, P. D. Optical routing and sensing with nanowire assemblies. Proc. Natl. Acad. Sci. U.S.A. 102, 7800-7805 (2005).

Sirbuly, D. J., Tao, A., Law, M., Fan, R. & Yang, P. D. Multifunctional nanowire evanescent wave optical sensors. Adv. Mater. 19, 61-66 (2007).

Smith, P. A., Nordquist, C. D., Jackson, T. N., Mayer, T. S., Martin, B. R., Mbindyo, J. & Mallouk, T. E. Electric-field assisted assembly and alignment of metallic nanowires. Appl. Phys. Lett. 77, 1399-1401 (2000).

Wang, P., Fang, J. J., Hou, Y., Du, X. B. & Zhu, D. M. Viscoelastic Properties of Polyethylene Glycol (PEG) Boundary Layers near a Solid Substrate. J. Phys. Chem. C 113, 729-735 (2009).

Sofia, S. J., Premnath, V. & Merrill, E. W. Poly(ethylene oxide) grafted to silicon surfaces: Grafting density and protein adsorption. Macromol. 31, 5059-5070 (1998).

Sonnichsen, C., Reinhard, B. M., Liphardt, J. & Alivisatos, A. P. A molecular ruler based on plasmon coupling of single gold and silver nanoparticles. Nature Biotechnol. 23, 741-745 (2005).

Spillane, S. M., Kippenberg, T. J., Painter, O. J. & Vahala, K. J. Ideality in a fiber-taper-coupled microresonator system for application to cavity quantum electrodynamics. Phys. Rev. Lett. 91, 043902 (2003).

Sulchek, T. A. et al. Dynamic force spectroscopy of parallel individual Mucin1-antibody bonds. Proc. Natl. Acad. Sci. U.S.A. 102, 16638-16643 (2005).

Sun, C. S. Multiplexing of fiber-optic acoustic sensors in a Michelson interferometer configuration. Opt. Lett. 28, 1001-1003 (2003).

Suresh, S., Biomechanics and biophysics of cancel cells, Acta Biomater. 2007, 3, 413-438.

Suresh, S.; Spatz, J.; Mills, J. P.; Micoulet, A.; Dao, M.; Lim, C. T.; Bell, M.; Seufferlein, T., Connections between single-cell biomechanics and human disease states: gastrointestinal cancer and malaria, Acta Biomater. 2005, 1, 15-30.

Tan, J. L. et al. Cells lying on a bed of microneedles: An approach to isolate mechanical force. Proc. Natl. Acad. Sci. U.S.A. 100, 1484-1489 (2003).

Tong, L. M. et al. Photonic nanowires directly drawn from bulk glasses. Opt. Expess 14, 82-87 (2006).

Tong, L. M. et al. Subwavelength-diameter silica wires for low-loss optical wave guiding. Nature 426, 816-819 (2003).

Wallace, M. I., Molloy, J. E. & Trentham, D. R. Combined single-molecule force and fluorescence measurements for biology. J. Biol. 2, 4 (2003).

\* cited by examiner

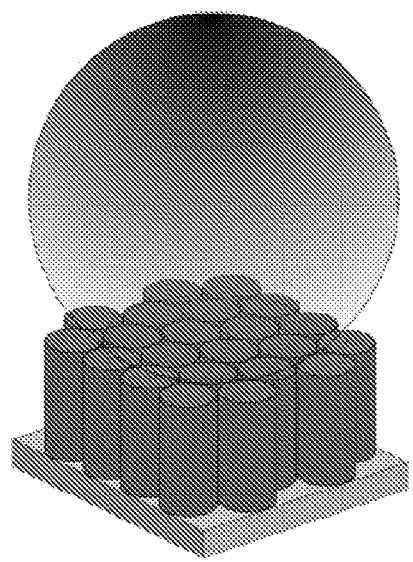
Top View
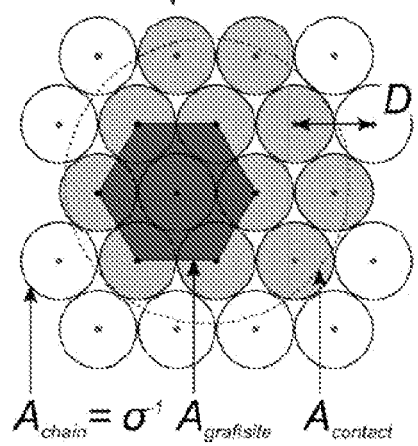
$A_{chain} = \sigma^{-1}$  $A_{graftsite}$  $A_{contact}$
Side View
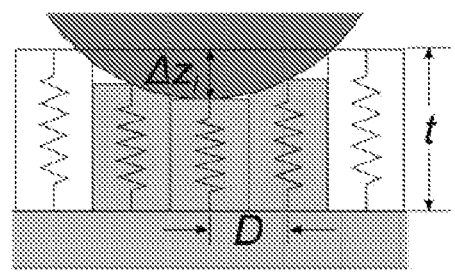
FIG. 2

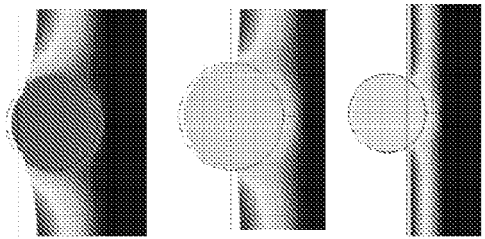
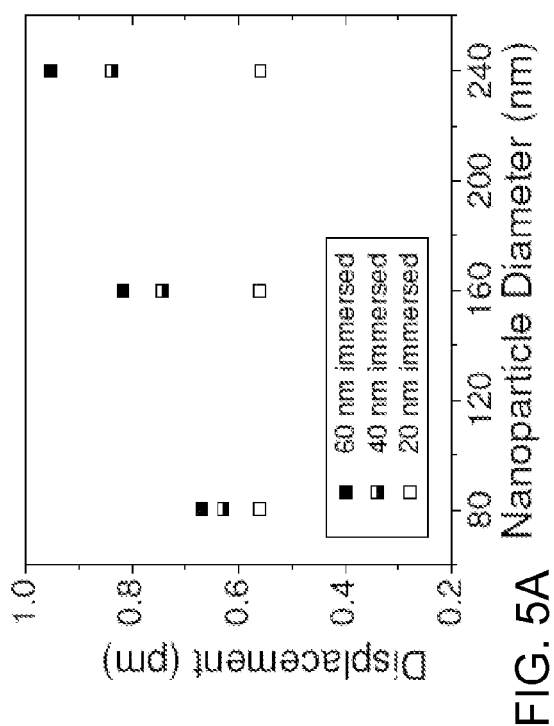
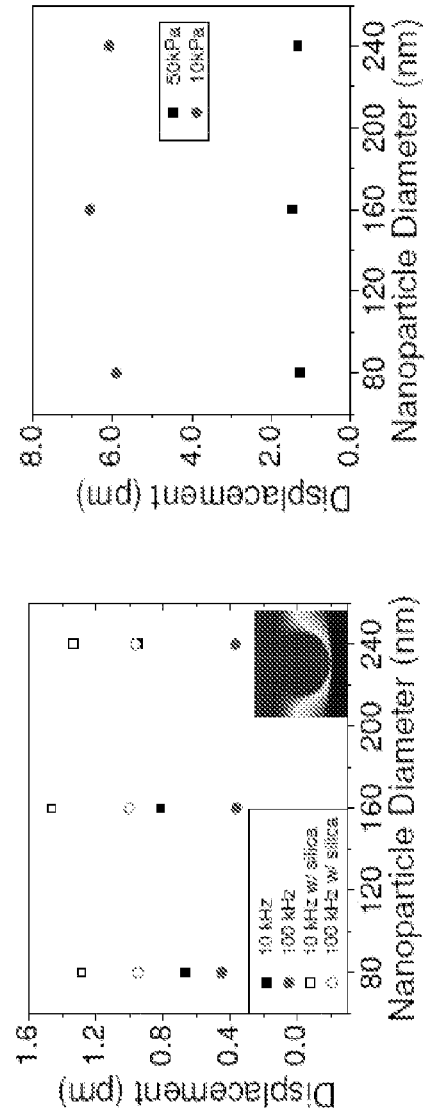
FIG. 5A   FIG. 5B   FIG. 5C   FIG. 5D

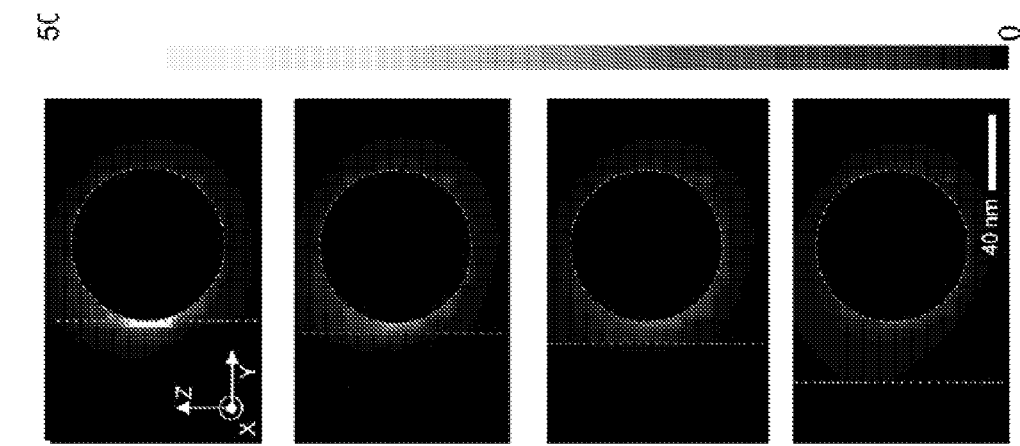
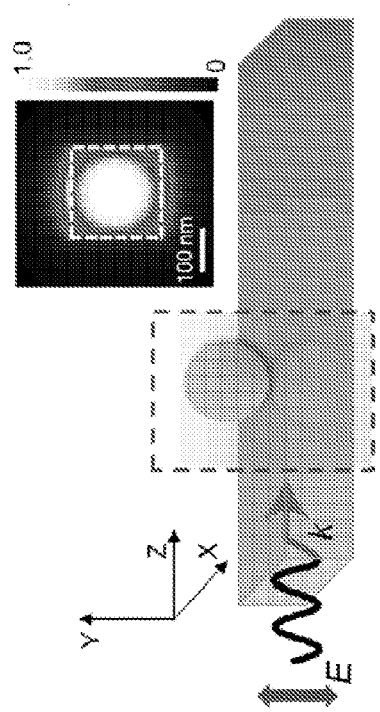
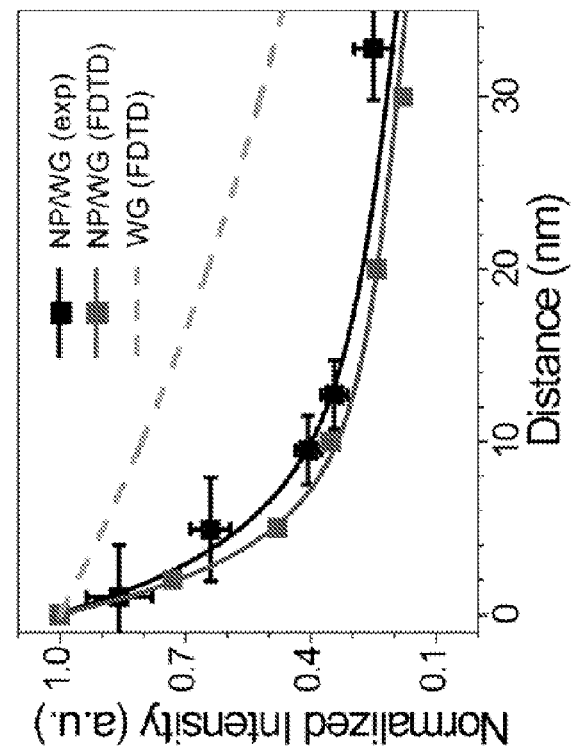
FIG. 8A
FIG. 8B
FIG. 8C

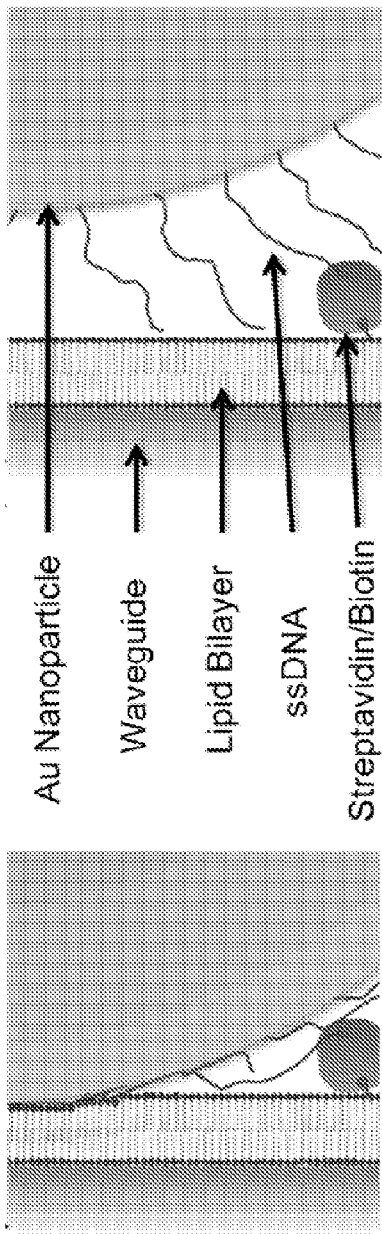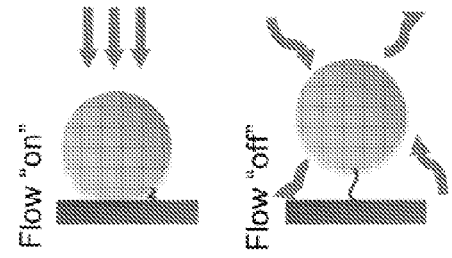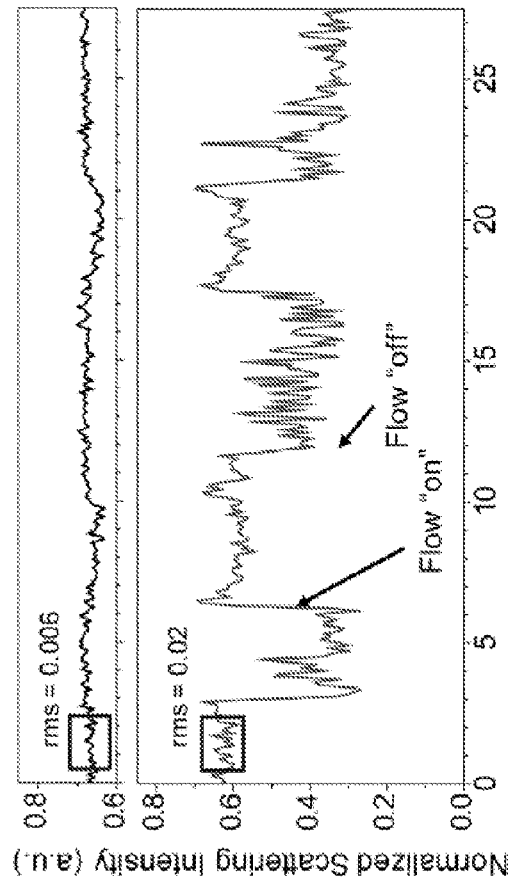

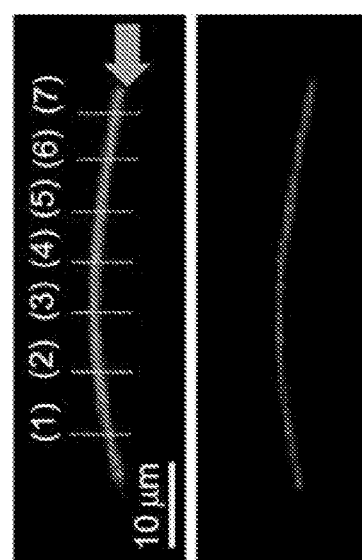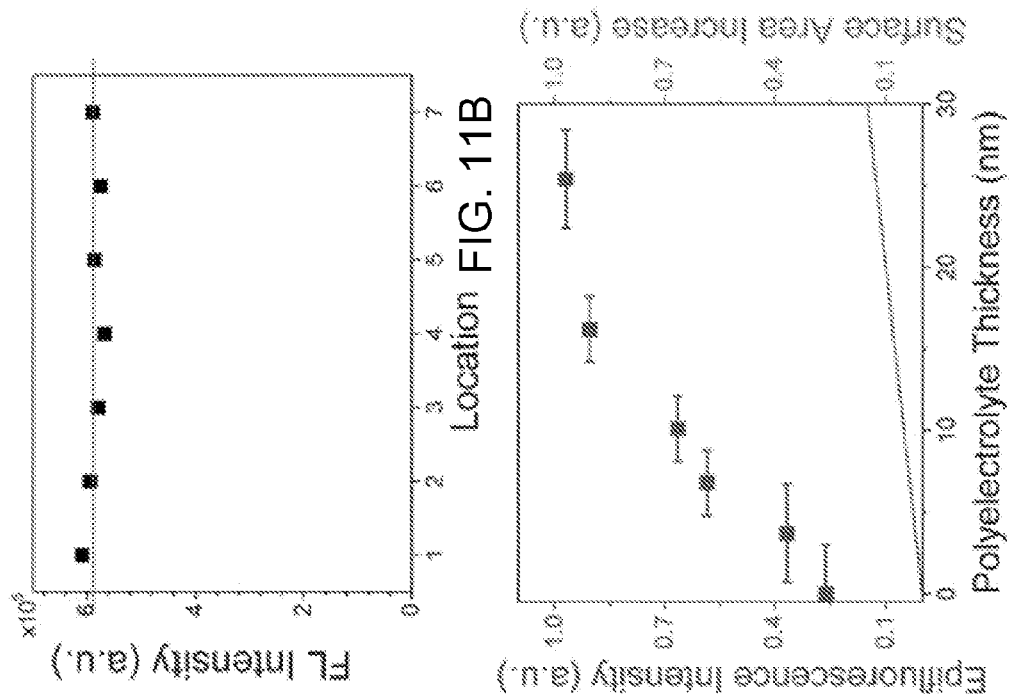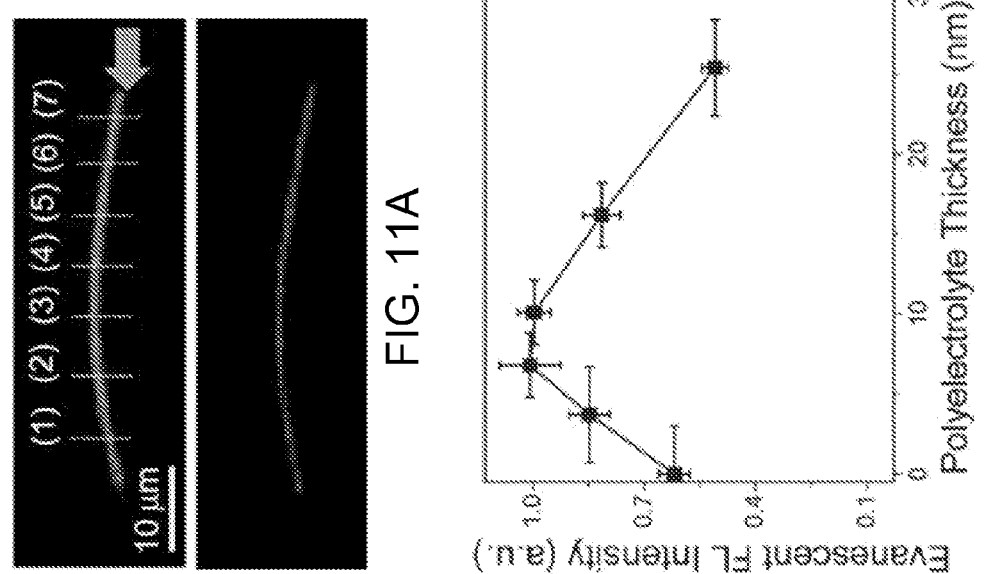
FIG. 11A
FIG. 11B
FIG. 11C
FIG. 11D

ULTRA-SENSITIVE FORCE SENSING BASED ON EVANESCENT LIGHT

PRIORITY CLAIM AND RELATED PATENT APPLICATION

This patent document is a 35 USC §371 National Stage application of International Application No. PCT/US2014/012621 filed Jan. 22, 2014, which further claims the benefit of U.S. Provisional Application No. 61/755,436 entitled "FIBER OPTIC FORCE SENSING TRANSDUCER" and filed Jan. 22, 2013, the disclosures of which are incorporated by reference as part of the specification of this document.

STATEMENT OF GOVERNMENT SUPPORT

This invention was made with government support under contract number 1150952 awarded by the National Science Foundation (NSF). The government has certain rights in the invention.

BACKGROUND

This patent document relates to systems, devices, and processes related to force sensor and transducer technologies.

The ability to measure forces and/or mechanical displacements with high precision may have direct implications on the development of advanced sensing platforms that can respond to acoustic, strain, pressure, and/or chemical signals. Measuring small forces (<1 nN) is typically carried out by sophisticated instruments such as an optical trap (or optical tweezer) or atomic force microscope (AFM) which acts as a calibrated force transducer that can directly measure the force and distance of a system. These techniques offer force sensitivity in the piconewton range, but it is extremely difficult to integrate these platforms into transportable, or embeddable, sensors that can detect stimuli such as sound waves, pressure changes, or chemicals. Significant difficulties exist in many microscopy-based systems, such as AFM, to image non-planar surfaces (e.g., side surfaces, inside trenches, etc.) or image all dimensions of a material. Additionally, existing techniques may not be sufficiently capable of quantifying forces occurring inside of a material, e.g., a cell.

SUMMARY

Techniques, systems, and devices are disclosed for measuring extremely small forces (e.g., around or below piconewtons) generated by various stimuli such as acoustic signals, pressure, strain, cells, and chemicals.

In one aspect, a method for optical sensing is provided to include attaching one or more optical structures outside an external surface of an optical waveguide while within an evanescent field of light guided by the optical waveguide to cause the one or more optical structures to evanescently interact with the guide light to emit light; measuring the emitted light from an optical structure to indicate a position of the optical structure relative to the external surface of the optical waveguide; and using the position of the optical structure relative to the external surface of the optical waveguide to obtain information on a force applied to the optical structure.

Various implementations are provided. For example, the disclosed technology can include a single element fiber optic force sensor and transducer that is highly tunable and can be configured as a scan probe device. The exemplary fiber optic force sensors and transducers can utilize the movement of optical structures (e.g., plasmonic nanoparticles, fluorescent molecules) embedded in the evanescent field of a subwavelength optical fiber (or more generally a waveguide) to detect forces imposing on the fiber. The disclosed technology pushes the limits of force sensitivity, portability, and tenability relative to present technologies.

The subject matter described in this patent document can be implemented in specific ways that provide one or more of the following features. For example, the disclosed technology can provide a single element fiber optic force sensor that is highly tunable and can be configured for various applications including: nanomechanical sensors for medical research (cancer diagnostics, fundamental cellular studies, single molecule analytics, and real-time biological responses); fiber optic sensors tuned to detect sound waves (underwater receiver for marine-life research), chemicals, pressure/temperature changes; and scanning probes capable of imaging topography of planar and non-planar surfaces. Exemplary implementations have been executed in the form of demonstrations of: angstrom-level sensitivity of the evanescent field to distance normal to the propagation of light by utilizing fluorescently-tagged self-assembled polymer coatings and plasmonic nanoparticles to map out the waveguide near-field; and real-time monitoring of single molecules stretching using single-strand DNA linking the waveguide with a plasmonic nanoparticle and measuring the scattering intensity as a function of fluidic force. Exemplary applications of the disclosed technology can include nanomechanical sensors for medical research including cancer diagnostics, fundamental cellular studies, single molecule analytics, and real-time biological responses; fiber optic sensors tuned to detect signals such as sound waves (underwater receiver), chemicals, pressure changes, and temperature fluctuations; and scanning probe capable of imaging topography of planar and non-planar surfaces.

In another aspect, the disclosed technology can include an optical-mechanical force-sensing device that can detect very small force magnitudes. The force-sensing device can include an optical waveguide for internally guiding a light through; one or more compressible coatings formed on a surface of the optical waveguide while substantially embedded in an evanescent field of the guided light of the optical waveguide. The force-sensing device can also include one or more optical structures attached to an external surface of the one or more compressible coatings in the evanescent field. During a force detection operation, each of the one or more optical structures can emit light based on an interaction with the evanescent field to indicate a displacement of the optical structure relative to the surface of the optical waveguide caused by an external force exerted on the optical structure. An optical detector can be positioned in the far field of the emitted light to measure the intensity of the emitted light from the optical structure. The measured intensity can be converted into the displacement of the optical structure relative to the surface of the optical waveguide, wherein the displacement can be subsequently converted into the force that displaced the optical structure.

In some implementations, the optical detector is used to measure a total intensity of the emitted lights from the one or more optical structures. In these implementations, the total intensity is then converted into the displacement of the optical structure relative to the surface of the optical waveguide.

In some implementations, the optical detector is configured to independently measure an intensity of the emitted light from each of the one or more optical structures.

In some implementations, the force-sensing device further includes a second optical detector positioned at the output end of the optical waveguide and configured to measure an intensity of the transmitted light through the optical waveguide. The measured intensity can then be converted into the displacement of the optical structure relative to the surface of the optical waveguide, wherein the displacement can be subsequently converted into the force that displaced the optical structure.

In some implementations, the one or more compressible coatings are configured to be compressed by the optical structure when the optical structure displaces by a downward force exerted on the optical structure. The one or more compressible coatings are configured to be stretched when the optical structure displaces by an upward force exerted on the optical structure. Further, the one or more compressible coatings are configured to restore shape when the downward force exerted on the optical structure is reduced or removed.

In some implementations, the one or more compressible coatings are fully reversible in shape after being compressed or stretched.

In some implementations, the one or more compressible coatings are characterized by a stiffness.

In some implementations, the one or more compressible coatings are formed by a polymer material.

In some implementations, the polymer material includes a polyelectrolyte material.

In some implementations, the polyelectrolyte material is polyethyleneimine (PEI), polystyrene sulfonate (PSS), or poly(allylamine hydrochloride) (PAH).

In some implementations, the one or more optical structures include a plasmonic nanoparticle, which can include a gold nanoparticle, a silver nanoparticle, or other metallic nanoparticles.

In some implementations, the one or more optical structures include a quantum dot.

In some implementations, the plasmonic nanoparticle interacts with the evanescent field through a plasmon-dielectric coupling.

In some implementations, the wavelength of the guided light is selected to include a resonance waveguide of the plasmonic nanoparticle.

In some implementations, the one or more optical structures include a fluorescent molecule or particle, and the fluorescent molecule or particle interacts with the evanescent field through a fluorescent interaction.

In some implementations, the optical waveguide includes a subwavelength optical fiber.

In some implementations, the subwavelength optical fiber is made of tin oxide ($SnO_2$).

In some implementations, the external force includes one of: an acoustic wave signal, strain, pressure, and chemical signals.

In some implementations, the optical force-sensing device has a displacement sensing resolution of about 1 angstrom.

In some implementations, the optical force-sensing device has a force sensing resolution of <100 femtonewtons.

In some implementations, the optical force-sensing device has a force sensing range from femtonewtons to nanonewtons.

In some implementations, the one or more compressible coatings have a total thickness less than 20 nm.

In some implementations, each of the one or more optical structures has a size less than 100 nm.

In yet another aspect, a method for making an optical-mechanical force-sensing device includes the steps of: forming one or more compressible coatings on a surface of an optical waveguide operable to internally guide light, wherein the one or more compressible coatings are substantially within an evanescent field range of a guided light of the optical waveguide; and attaching one or more optical structures to an external surface of the one or more compressible coatings, wherein each of the one or more optical structures is configured to emit light based on an interaction with an evanescent field near the surface of the optical waveguide to indicate a displacement of the optical structure relative to the surface of the optical waveguide caused by an external force exerted on the optical structure.

In some implementations, the one or more compressible coatings are configured to be compressed by the optical structure when the optical structure displaces by a downward force exerted on the optical structure. Further, the one or more compressible coatings are configured to be stretched when the optical structure displaces by an upward force exerted on the optical structure.

In yet another aspect, the disclosed technology provides a process for performing an optical-mechanical force-sensing. The disclosed force-sensing process starts by obtaining an optical sensor that is comprises of: an optical waveguide operable to internally guide light; one or more compressible coatings formed on a surface of the optical waveguide, and configured to be substantially within an evanescent field of the guided light of the optical waveguide; and one or more optical structures attached to an external surface of the one or more compressible coatings in the evanescent field. The process then guides a light through the optical waveguide to cause each of the one or more optical structures to emit light based on an interaction with an evanescent field near the surface of the optical waveguide. Next, the process determines a displacement of the optical structure relative to the surface of the optical waveguide caused by an external force exerted on the optical structure. Finally, the process converts the determined displacement into a force which causes the displacement of the optical structure.

In some implementations, the process determines the displacement of the optical structure by: measuring an intensity of the emitted light from the optical structure in the far field of the emitted light; and converting the measured intensity into the displacement of the optical structure relative to the surface of the optical waveguides.

In some implementations, prior to converting the measured intensity into the displacement of the optical structure, the process calibrates a relationship between a scattering intensity by the optical structure and a distance of the optical structure relative to the surface of the optical waveguides.

In some implementations, the process determines the displacement of the optical structure by: measuring a total intensity of the emitted lights from the one or more optical structures; and converting the total intensity into the displacement of the optical structure relative to the surface of the optical waveguide.

In some implementations, the process determines the displacement of the optical structure by independently measuring an intensity of the emitted light from each of the one or more optical structures.

In some implementations, the process determines the displacement of the optical structure by: measuring an intensity of the transmitted light through the optical waveguide at the output end of the optical waveguide; and converting the measured intensity into the displacement of the optical structure relative to the surface of the optical waveguides.

In some implementations, prior to converting the determined displacement into the force which causes the displacement of the optical structure, the process calibrates a relationship between the displacement of the optical structure and an external force exerted on the optical structure based on mechanical properties of the one or more compressible coats.

In some implementations, the one or more optical structures include a plasmonic nanoparticle.

In some implementations, the plasmonic nanoparticle interacts with the evanescent field through a plasmon-dielectric coupling.

In some implementations, the process selects a wavelength of the guided light to include a resonance waveguide of the plasmonic nanoparticle In some implementations, the one or more optical structures include a fluorescent molecule or particle, and the fluorescent molecule or particle interacts with the evanescent field through a fluorescent interaction.

In some implementations, the external force includes one of: an acoustic wave signal, strain, pressure, cell and chemical signals.

In yet another aspect, an optical force-sensing device includes: an optical waveguide operable to internally guide light; and one or more optical structures configured to hover above a surface of optical waveguide while at least partially within the evanescent field of the guided light, wherein each of the one or more optical structures is configured to emit light based on an interaction with the evanescent field to indicate a displacement of the optical structure relative to the surface of the optical waveguide caused by an external force exerted on the optical structure.

BRIEF DESCRIPTION OF THE DRAWINGS

FIG. 2 presents diagrams of a mechanical polymer compression model showing the partitioning and compression of the compressible coating layer based on the density of grafting sites and the curvature of the nanoparticle indenter in accordance with some embodiments described herein.

FIG. 5A shows total displacement vs. nanoparticle size for different nanoparticle positions within the compressible coating in accordance with some embodiments described herein.

FIG. 5B shows images of total displacements for different sized nanoparticle embedded at various depths in the compressible coating in accordance with some embodiments described herein.

FIG. 5C shows total displacement vs. nanoparticle diameter for compressible coatings with and without thin silica coatings in accordance with some embodiments described herein.

FIG. 5D shows total displacement change vs. nanoparticle diameter for the silica coated PEG layer system in accordance with some embodiments described herein.

FIG. 8A shows a schematic of the configuration of the 3D FDTD simulations of an individual Au nanoparticle disposed on a WG in accordance with some embodiments described herein.

FIG. 8B shows YZ cross-sectional power distributions of the nanoparticle adjacent to the WG surface at different gap separations (from 0 to 30 nm) in accordance with some embodiments described herein.

FIG. 8C shows normalized scattering intensity of single Au nanoparticles, calculated by the FDTD calculations and polyelectrolyte experiments, as a function of WG-nanoparticle separation in accordance with some embodiments described herein.

FIG. 9A shows a schematic of the molecular tether between an Au nanoparticle and $SnO_2$ WG under fluid flow in accordance with some embodiments described herein.

FIG. 9B shows a schematic of the molecular tether between an Au nanoparticle and $SnO_2$ WG with no flow in accordance with some embodiments described herein.

FIG. 9C illustrates one trace of a single nanoparticle as the fluid pump is cycled between an "on" and "off" state in accordance with some embodiments described herein.

FIG. 9D shows schematics of a tethered nanoparticle under different fluidic flows (flow "on" vs flow "off") in accordance with some embodiments described herein.

FIG. 11A shows fluorescence (FL) images of FITC pumped with the evanescent field of a WG after depositing 3 (top) and 10 (bottom) PE bilayer spacers between the WG and final PAH-FITC layer in accordance with some embodiments described herein.

FIG. 11B shows fluorescence intensities at 7 different locations along the WG used in FIG. 10A in accordance with some embodiments described herein.

FIG. 11C shows raw FITC fluorescence intensity as a function of PEM thickness in accordance with some embodiments described herein.

FIG. 11D shows FITC fluorescence collected under epi-illumination showing the increase in signal due to the decrease in the fluorescence quenching and increase in total surface area of the fiber in accordance with some embodiments described herein.

Like reference symbols and designations in the various drawings indicate like elements.

DETAILED DESCRIPTION

Figure 1A:
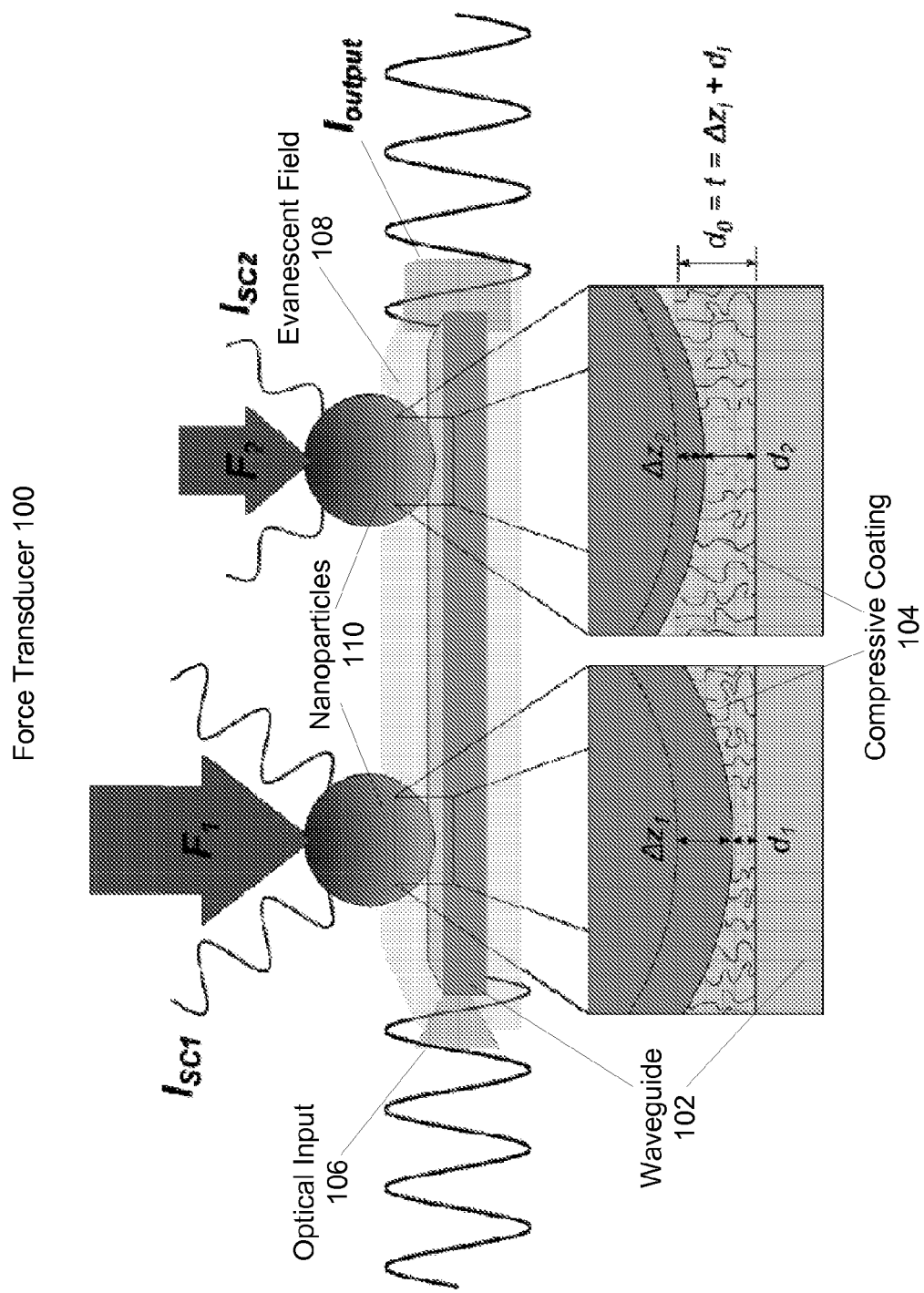
FIG. 1A illustrates a general setup and mechanism of operation of the nanoparticle-polymer-waveguide force transducer in accordance with some embodiments described herein.

Techniques, systems, and devices are disclosed for measuring extremely small forces (e.g., around or below piconewtons) generated by various stimuli such as sound/acoustic signals, pressure, strain, cells, and chemicals.

In one aspect, the disclosed technology can include an optical waveguide force sensor that can monitor the position of optical structures or optical transmitters (e.g., plasmonic nanoparticle, fluorescent objects) embedded in the evanescent field, wherein nano-sized or submicron-sized optical structures or optical transmitters can provide sensitive feedback on their distance from the waveguide surface. For example, since the intensity of the optical field decays exponentially away from the surface of the waveguide, it can be used to track the position of an object outside the surface of the waveguide that either scatter or fluoresce in the field. The stronger the decay, or the more non-linear the optical response of the optical structure or the optical transmitter is to the field, the better the sensitivity of the fiber. The position of the object outside the surface of the waveguide can be changed due to a force exerted onto the object and this change of the object position is based on the magnitude of the force.

In another aspect, the disclosed technology can include an optical-mechanical force-sensing device that can detect very small force magnitudes. The force-sensing device can include an optical waveguide for internally guiding a light through; one or more compressible coatings formed on a surface of the optical waveguide while substantially embedded in an evanescent field of the guided light of the optical waveguide. The force-sensing device can also include one or more optical structures attached to an external surface of the one or more compressible coatings in the evanescent field. During a force detection operation, each of the one or more optical structures can emit light based on an interaction with the evanescent field to indicate a displacement of the optical structure relative to the surface of the optical waveguide caused by an external force exerted on the optical structure. An optical detector can be positioned in the far field of the emitted light to measure the intensity of the emitted light from the optical structure. The measured intensity can be converted into the displacement of the optical structure or optical transmitter relative to the surface of the optical waveguide, wherein the displacement can be subsequently converted into the force that displaced the optical structure. In the discussion between, the terms "force sensor" and "force transducer" are used interchangeably.

Highly sensitive platforms for measuring forces at the nanoscale are becoming increasingly important as researchers push the frontiers of chemistry, materials science, biology, and medicine. Macroscopically, the characterization of bulk soft materials is an active area of research for scientists interested in developing biomaterials that mimic human tissues or investigating the biomechanical properties of cellular systems to diagnose diseased states. On the molecular level, single molecule force spectroscopy techniques have been employed to study various biochemical processes and their underlying reaction mechanisms, as well as binding affinities and cell-cell interactions for medical and pharmaceutical applications.

Detecting nanoscale forces in such systems often requires probes as small as the sample of interest to obtain measurements with sufficiently high resolution and sensitivity for proper characterization. Over the past two decades advances in scanning probe microscopy (SPM) technologies, optics, and nanopositioning hardware have yielded ultra-sensitive techniques such as atomic force microscopy (AFM), optical tweezers, and magnetic traps, which have been widely used in the types of applications listed above. In AFM systems a piezo-actuated stage and controller are used to scan a micron-sized cantilever probe across the surface of a sample where interactions (e.g., van der Waals, electrostatic, etc.) between the probe tip and the surface cause deflections of the cantilever. These interaction forces can be measured by reflecting a laser beam off the back of the cantilever and onto a position-sensitive diode, tracking the magnitude of the deflections. Optical tweezers use highly focused laser beams to produce a trapping potential that can hold and controllably move micron- and nanometer-sized dielectric particles. Similarly, magnetic traps employ a magnetic field to manipulate and exert forces on magnetic particles. Both these trapping platforms, after proper system calibration, can accurately measure forces that cause particle displacements out of the trap center by tracking the particle position under a microscope.

AFM systems and optical/magnetic traps routinely offer excellent displacement sensitivities (e.g., 0.5 nm for AFM; 0.1 nm for optical traps; 1 nm for magnetic traps) and force resolutions (e.g., 10 pN for AFM; 0.1 pN for optical traps, <0.1 pN for magnetic traps). However, it is extremely difficult to measure fine nanomechanical phenomena, for example, inside of a cell or any material, due to the size of the probes and the complicated mechanical feedback mechanisms. Moreover, multiplexing with scanning probe techniques or tweezer technologies is difficult because of the complex system integration required. Hence, there is an immediate need for compact, highly multiplexed, force-sensing platforms that can be easily inserted into materials and measure even smaller forces such as sub-piconewton level forces.

This patent disclosure provides various examples of systems, devices, and processes for very small magnitude force sensing using optical structures or optical transmitters, such as nanoparticles that are attached to a thin polymer coating embedded within the evanescent field of an optical waveguide, such as a nanofiber waveguide. In some implementations, a proposed force sensing system is configured with an optical input coupled into an optical waveguide, and one or more nanoparticles coupled to the waveguide, each of which serves as an independent force transducer. The proposed force sensing technology achieves a number of advantages over the existing system for nanomechanical analysis, including but are not limited to: (1) simplifying the mechanical feedback mechanism; (2) reducing the size of the transducer to <300 nm; and (3) allowing for high-throughput data collection.

In the following discussion, a mechanical "compression" model is provided for the nanoparticles coupled to a mechanically compliant waveguide coating layer (or simply "coating" or "cladding" hereinafter) and for the force detection resolution and capabilities of such a system. The compression model is then used to compare the proposed force sensing system with AFM force-mapping systems on thin polymer coatings. The results indicate the proposed system can compete with state-of-the-art AFM and trapping systems in terms of displacement sensitivity and force resolution, but does not require elaborate scanning stages or controller setups, direct light exposure to the sample, or multiple cantilevers or beam wastes for simultaneous measurements Optical-Mechanical Force Transducers FIG. 1A illustrates a general setup and mechanism of operation of the nanoparticle-polymer-waveguide force transducer 100 in accordance with some embodiments described herein. As can be seen in FIG. 1A, force transducer 100 includes an optical waveguide 102 coated with a layer of compressible coating 104 of thickness $d_0$ (coating 104 is shown in the insets of FIG. 1A). In one embodiment, optical waveguide 102 is a subwavelength optical waveguide. In a particular embodiment, the subwavelength optical waveguide is made of tin oxide ($SnO_2$). An optical input 106 is coupled into optical waveguide 102 from the left and propagates to and exits out of the right side of the waveguide 102. In a particular embodiment, compressible coating 104 is substantially embedded in the decaying evanescent field 108 of the subwavelength optical waveguide 102.

In some embodiments, compressible coating 104 includes a polymer coating. Examples of the polymeric compressible coating 104 can include polyethylene glycol (PEG), deoxyribonucleic acid (DNA), siloxane derivatives (e.g., polydimethylsiloxane), polyvinyl derivatives (e.g., polyvinyl butyral), and polyester derivatives (e.g., polyethylene terephthalate). In some embodiments, compressible coating 104 comprises one or more compressible layers.

Fiber optic force transducer 100 also includes plasmonic nanoparticles 110 (e.g., 50-100 nm diameter gold spheres) that are coupled to the high-refractive index waveguide via the thin compressible coating 104. Each nanoparticle 110 is shown at least partially embedded within the evanescent field 108 surrounding the waveguide 192. In some embodiments, the entire nanoparticle 110 can be positioned within the evanescent field 108. In some other embodiments, only the bottom portion of the nanoparticle 110 is inside the evanescent field 108. Forces acting on the nanoparticles cause their indentations into the compressible polymer coating 104 and thus change the particle-waveguide separation distances and the intensity of light they scatter. In the example of FIG. 1A, $F_1$ on the sphere on the left is greater than $F_2$ on the sphere on the right. Hence, the indentation caused by $F_1$ is greater than the indentation cause by $F_2$. The schematic is not drawn to scale. While FIG. 1A shows two nanoparticles, other implementations of the optic force transducer can have one or more nanoparticles.

To measure forces with the force transducer 100, the compressible coating 104 serves as a mechanical resistance, or spring, that supports and holds nanoparticles 110, i.e., the optical transducers, at a specific location within the optical field. For example, a movement away (negative force) or toward (positive force) the waveguide surface would therefore be quantified by a decrease or increase, respectively, in the scattering intensity of the nanoparticles (shown as $I_{SC1}$ and $I_{SC2}$ in FIG. 1A). A compressible coating can be deposited with controlled thicknesses and densities which allows the elastic modulus of the layer to be tuned to a desirable values, for example, for hydrogels (e.g., polyelectrolyte films) or PEG this value can be below 50 kPa. With the distance sensitivity of the evanescent field at 1 angstrom, this fiber optic force sensing system is capable of detecting sub-piconewton forces. Because the optical structures or optical transmitters, compressible coatings, and waveguide surface are all chemically modifiable, the fiber optic force transducer 100 can be configured to detect forces from stimuli including but not limited to: acoustic wave signals, pressure, strain, and chemicals.

FIG. 1A also shows an exemplary schematic of a polymer coating (such as PEG) which can be compressed to different amount ($d_1$ and $d_2$) due to the different external forces $F_1$ and $F_2$. The change in scattering intensity can also be measured by monitoring the transmitted light $I_{output}$ which would show a decrease (increase) in signal upon a positive (negative) force. By placing a compressible coating 104 between the optical structures or optical transmitters and the waveguide surface, the local forces can be monitored with high sensitivity.

The distance response of nanoparticles 110 moving in the evanescent field 108 of the waveguide 102 can be measured both under resonant and non-resonant conditions. The non-resonant measurement can include detecting fluorescent emission, which has been found to have a spatial sensitivity of approximately 1 nm. In contrast, the resonant measurement can include sensing plasmonic nanoparticles resonate with the wavelength in the waveguide, which has shown 1 Å sensitivity, a significant enhancement in tracking the nanoparticles movement over the fluorescent sensing.

For example, in a dynamic environment where a single molecule DNA tether is linked between the waveguide and plasmonic nanoparticle, angstrom-level distance sensitivity has been recorded when the tether is compressed or stretched due to fluid forces acting on the nanoparticle. This enhanced distance sensitivity can be contributed to plasmon-dielectric coupling effects between the metal nanoparticles and the waveguide surface. More specifically, upon plasmonic excitation via the evanescent-field of the waveguide, the dipoles in the metal induce dipoles in the neighboring dielectric, which in turn significantly increases the scattering cross-section of the metal particle when it is within about 10 nm of the waveguide surface. Conversely, non-plasmonic optical structures or optical transmitters such as quantum dots or fluorescent molecules typically only track the optical power decay (i.e., $|E|^2$, where E is the electric field strength of the electromagnetic wave) of the evanescent field. It has been found that the distance-dependent scattering cross-section of the plasmonic optical structures or optical transmitters summed with the decaying near-field can produce decay constants of the total scattering signal, $I_{sc}$, that are over an order of magnitude smaller than those produced by non-plasmonic materials.

By leveraging the steeper scattering ($I_{sc}$) Decay of the Plasmonic Particles, angstrom-level spatial sensitivity can be achieved which is comparable to that of optical traps. To convert the distance measurements into a force measurement, a distance-dependent mechanical feedback for the nanoparticle is needed. In some implementations, this conversion can be realized with a compressible coating that is not only thin, but also mechanically compliant, such as a polymer brush (or "brush" hereinafter), a hydrogel film, or a self-assembled polyelectrolyte multilayer (PEM) coating. More specifically, a calibration process may be used to characterize the relationship between the force acting on the plasmonic transmitter and its indentation into the compressible coating, $F_{np}(\Delta z)$, wherein $\Delta z=t-d$ (where t is the compressible coating thickness and d is the particle-waveguide separation distance). Because the measured optical transmission of the scattering intensity $I_{sc}$ can be calibrated and correlated with particle-waveguide separation distance d, the measured scattering intensity $I_{sc}$ can then be correlated with $F_{np}$ and the force acting on the nanoparticles can be read out in real time by simply monitoring the depths of the optical modulation.

Figure 1B:
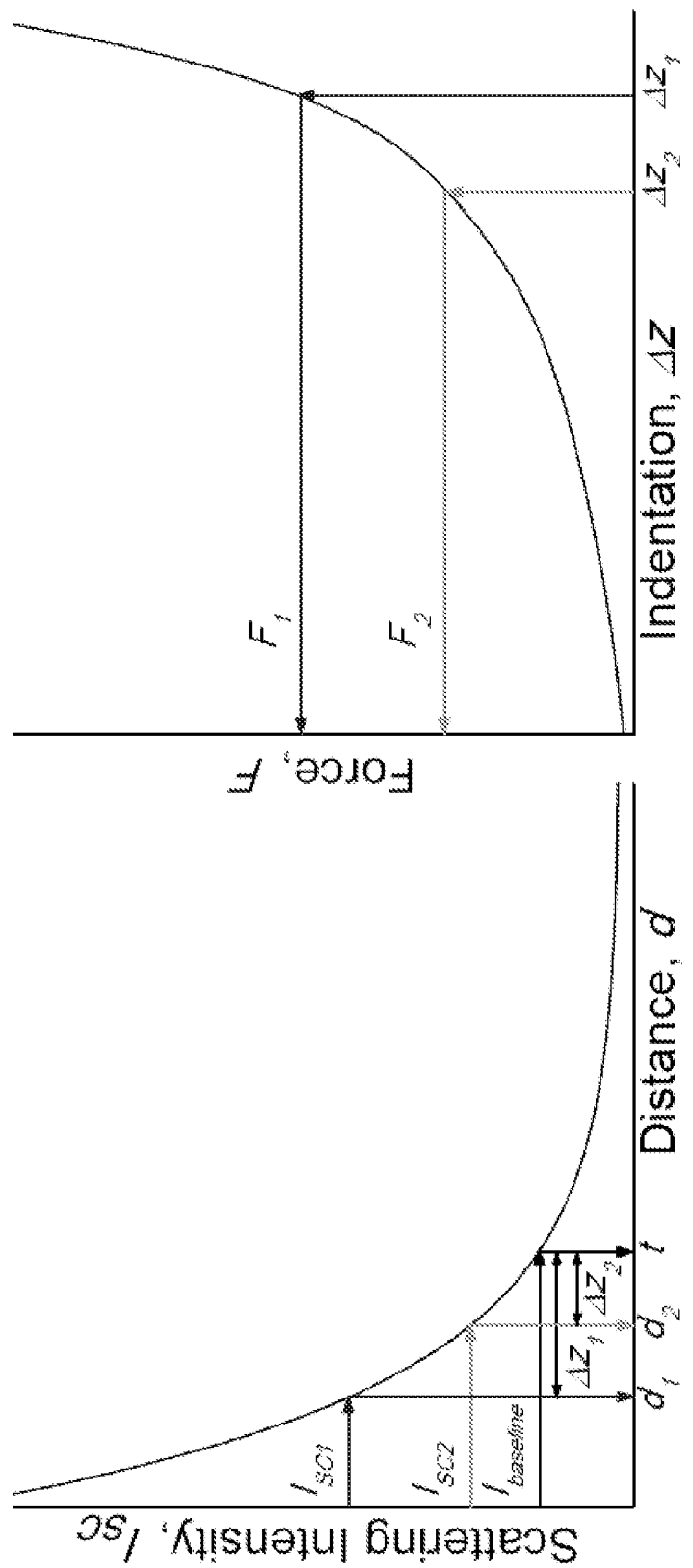
FIG. 1B shows exemplary calibration curves for converting measured scattering intensity into a force measurement in accordance with some embodiments described herein.

FIG. 1B shows exemplary calibration curves for converting measured scattering intensity $I_{sc}$ into a force measurement in accordance with some embodiments described herein. More specifically, modulations in the collected scattering signals relative to their baseline signals (when no force acts on the particles) are used to measure small displacements of the nanoparticle optical sensor relative to the waveguide (the left plot in FIG. 1B). Once displacements are obtained, the force can be quantified based on a predetermined force-indentation relationship for the compressible coating (the right plot in FIG. 1B). This force-indentation relationship can be obtained using calibrated force transducers such as an AFM or optical/magnetic trap.

As mentioned above, two scattering intensity $I_{sc}$ detection modes are possible using the proposed optical-mechanical force sensing design: (1) the scattering intensity is measured directly from each individual nanoparticle in the far-field to obtain a multiplexed readout; or (2) the transmission through the fiber optic can be detected which will be modulated by the nanoparticles movements for in situ measurements. For example, for the system of FIG. 1A, either $I_{SC1}$ and $I_{SC2}$ are monitored for multiplexed real-time signal detection, or $I_{output}$ is monitored for transmission experiments if all nano-particles move in phase (not shown). Note that signals in the two modes of detection will modulate in opposite directions for a given force.

Figure 1C:
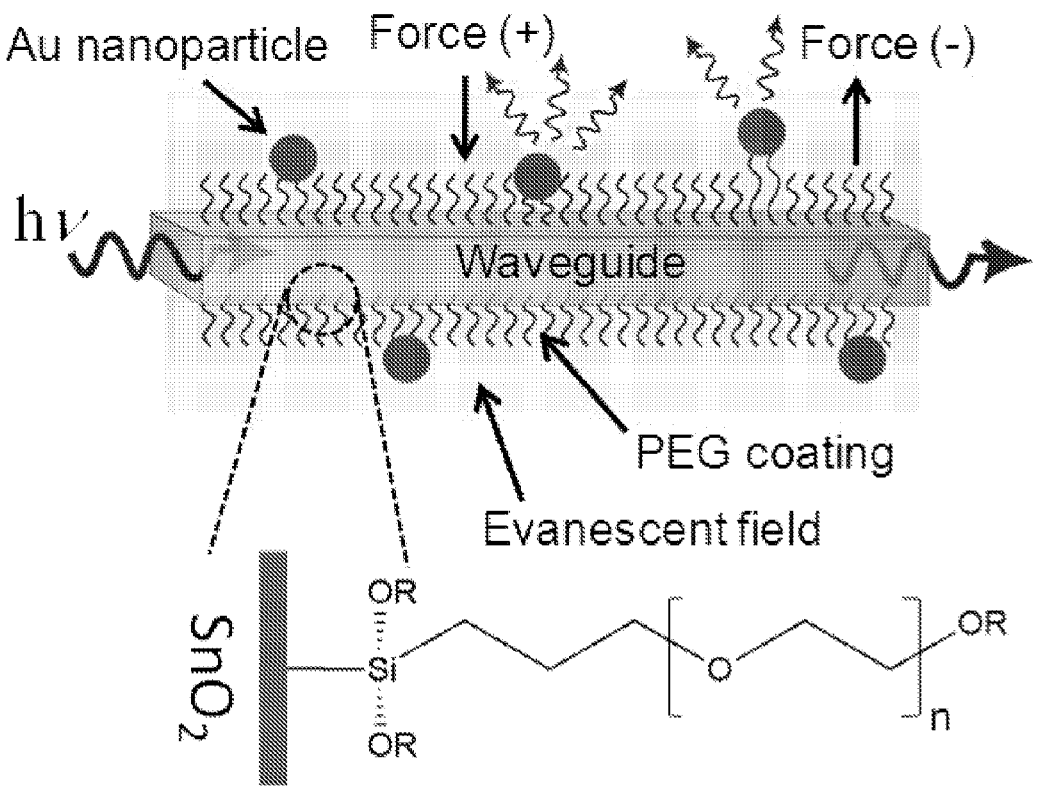
FIG. 1C shows an exemplary schematic of a PEG coated waveguide with Au nanoparticles which can stretch or compress PEG chains under applied forces in accordance with some embodiments described herein.

To measure forces with the optical structures or optical transmitters embedded in the evanescent field, there can be some sort of mechanical resistance, or spring, that holds the optical structures or optical transmitters at a specific location within the optical field. For example, any movement away (negative force) or towards (positive force) the waveguide surface would therefore be quantified by a decrease or increase, respectively, in the scattering intensity of the particle (as shown in FIG. 1C). FIG. 1C shows an exemplary schematic of a PEG coated waveguide with Au nanoparticles which can stretch or compress PEG chains under applied forces in accordance with some embodiments described herein. The bottom image in FIG. 1C shows a PEG silane molecule grafted to the $SnO_2$ surface. The change in scattering intensity can also be measured by monitoring the transmitted light which would show a decrease (increase) in signal upon a positive (negative) force. By placing a compressible coating between the optical structures or optical transmitters and waveguide surface, the local forces can be monitored with high sensitivity. Examples of such compressible coating include polyethylene glycol (PEG), deoxyribonucleic acid (DNA), siloxane derivatives (e.g., polydimethylsiloxane), polyvinyl derivatives (e.g., polyvinyl butyral), and polyester derivatives (e.g., polyethylene terephthalate). A PEG coating can be deposited with controlled thicknesses and densities which allows the elastic modulus of the layer to be tuned to values below 50 kPa. With the distance sensitivity of the evanescent field at 1 angstrom, this fiber optic force sensing platform should be capable of detecting sub-piconewton forces. Because the optical structures or optical transmitters, compressible coatings, and waveguide surface are all chemically modifiable, the fiber optics can be encoded to detect forces from stimuli such as acoustic signals, pressure, strain, and chemicals.

The disclosed technology can address plasmon-dielectric coupling effects, for example, by including a compressible coating between the particle and waveguide. Exemplary schematics are shown in FIG. 1C to illustrate the effect of forces on a plasmonic nanoparticle attached to a soft, compressible coating. As can be seen in FIG. 1C, a positive (i.e., downward) force causes the Au nanoparticle to compress down the PEG coating and generate a stronger scattering intensity. In contrast, a negative (i.e., upward) force causes the Au nanoparticle to stretch up the PEG coating and generate a weaker scattering intensity.

Figure 1D:
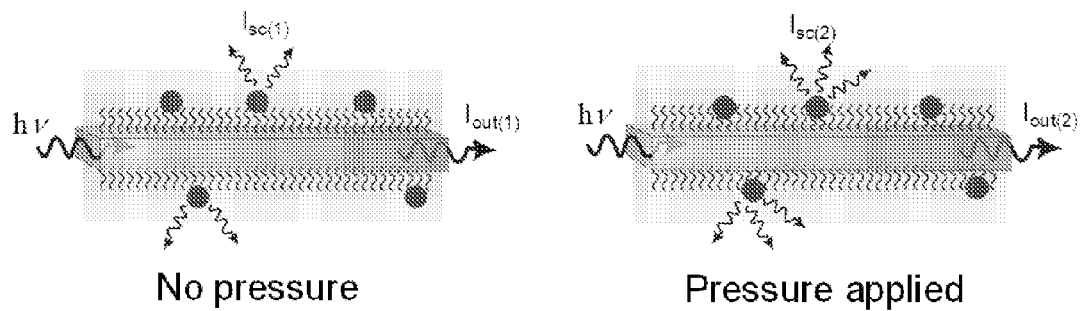
FIG. 1D shows an exemplary process of using pressure changes to calibrate the fiber force sensor in accordance with some embodiments described herein.

The disclosed technology can include polymer coated fibers decorated with plasmonic optical structures or optical transmitters, and can test their force sensitivity. To calibrate the system, fluidic and/or gas pressure can be implemented to apply controlled forces to the functionalized fibers. The disclosed fiber optic force sensor and transducer devices and systems can be configured to be extremely sensitive to forces. For example, the evanescent field profiling data and first-order approximations on how much a polymer can compress under force (using known values for the elastic modulus of various polymers) can be used to deduce such forces. For example, as shown in FIG. 1D, pressure changes can be used to calibrate the fiber force sensor. Under no pressure (fluidic or gas) the scattering intensity $I_{sc(1)}<I_{sc(2)}$ since the particle is further away from the surface of the waveguide. Likewise, the transmitted signal $I_{out(1)}>I_{out(2)}$ since the optical structures or optical transmitters will be extracting less light out of the fiber when no force is being applied.

Note that while we describe force transducer 100 having the nanoparticles 110 directly attached to the surface of the compressive layers, other embodiments of the force transducer can have one or more nanoparticles suspended or hovering above the surface of the optical waveguide. In these embodiments, a magnetic force or an electrostatic force may be used to keep the one or more nanoparticles suspended/hovering above the surface of optical waveguide. However, the one or more nanoparticles remain positioned at least partially within the evanescent field of the waveguide, and each of the one or more nanoparticles is configured to emit light based on an interaction with the evanescent field to indicate a displacement of the nanoparticles relative to the surface of the optical waveguide caused by an external force exerted on the nanoparticles. In these embodiments, the compressive coatings shown in FIG. 1A may be omitted.

Mechanical Model of Force Transducers

To compare the proposed optical-mechanical force sensing system with existing nanomechanical instruments, it is necessary to develop a mechanical model for predicting the force resolutions and dynamic ranges of the proposed system. Ideally, the model can not only predict the sensitivities of the system, but also provide guidance for experimental tuning of the mechanical properties of the compressible coating. In one embodiment, a primarily mechanistic approach is used to formulate the model and based its inputs on actual measurable parameters of the compressible coating, such as the elastic modulus, thickness, grafting density, and chain molecular weight (i.e., E, t, σ, and MW, respectively). To guide the model development, specific assumptions can be made about the properties of the compressible coating a priori, which include: (1) achieving a high force sensitivity would require the compressible coating material to be soft (i.e., E is small), (2) for simplicity the compressible coating is stressed only in the linearly elastic regime (i.e., E is constant with varying $F_{np}$), and (3) the accuracy and reproducibility of measurements requires that the compressible coating be strained without plastic deformation and that its mechanical properties do not change under repeated loadings (E is constant with Δz and time).

Furthermore, versatility of the compressible coating in a real system may be dictated by the compressible coating's stability in different environments such as cyclic wet and dry conditions and solutions of various ionic strengths. Because a practical model should be able to predict the behavior in a real system, the model is validated by mechanically testing real polymer coating and comparing the experimental and theoretical (model) data. In one implementation, the polymer systems chosen to calibrate and validate the model include thin polyethylene glycol (PEG) brushes, which have mechanical properties that have been well characterized. PEG brushes have also been shown to be stable in many different environments and their non-fouling properties can be ideal for measurements on biological materials. These qualities make them an excellent candidate to investigate the performance of the optical-mechanical structures.

In some embodiments, modeling the mechanical process of indenting a compressible coating with a plasmonic nanoparticle transmitter/transducer involves first considering the problem of elastic contact between two bodies as developed by Hertz. In the problem formulation, the bodies initially contact at a single point. When a load is applied to the system and pushes the bodies together, it causes each of the two bodies to deform. As the bodies deform, the area of contact, $A_{contact}$, also increases in size. For any given load the total deformation of each body is a function of its respective geometry and mechanical properties, which determines the spatial distribution of that load on $A_{contact}$. The overall indentation, Δz, is the sum of the deformations of both bodies.

FIG. 2 presents diagrams of a mechanical polymer compression model showing the partitioning and compression of the compressible coating layer based on the density of grafting sites and the curvature of the nanoparticle indenter in accordance with some embodiments described herein. Each cylindrical partition represents a single chain that is modeled as a linearly elastic spring with stiffness dependent on the modulus of the film, the grafting density of chains, and the average molecular weight. Top and side views show relevant parameters used in the model. The pink cylinders are those under compression.

More specifically, in the model of FIG. 2, the nanoparticle is represented by a rigid sphere while the coating is modeled as a flat elastic layer of uniform thickness on top of a flat, rigid substrate in accordance with some embodiments described herein. The illustrated geometry in FIG. 2 has been studied extensively and solutions of the contact problem relating total applied force to indentation distance have been formulated analytically by others. These solutions (as well as others that include correction factors for physically relevant systems) are widely utilized to analyze AFM measurements and extract mechanical properties from the F(Δz) curves.

The reverse of the above-described contact problem, i.e., to determine the force required for a particular indentation given the mechanical properties of the system, requires a hybrid elastic continuum-polymer physics model to study the nanoparticle-PEG compression mechanics as a function of physical brush properties and synthesis variables such as MW, t, and σ (chains/nm² or nm⁻²). Considering the polymer brush as a linearly elastic thin film, in the proposed model the polymer brush is partitioned into a close-packed hexagonal array of vertical right cylinders of uniform height and cross-sectional area, as shown in FIG. 2. This technique allows for the mechanical analysis of the polymer brush with respect to its structure, and by imposing scaling laws on the partitioning scheme that are rooted in polymer physics, facilitates the use of the model to mechanistically study the system. In particular, the hexagonal close-packed pattern ensures that the spacing between adjacent cylinders is uniform and minimizes the space unaccounted for between partitioned volumes.

More specifically, each cylinder in FIG. 2 represents the space occupied by a single chain in the polymer brush and is regarded as a continuous material with an elastic modulus, E. To maintain the close-packed configuration, the cross-sectional area of each cylinder, $A_{chain}$, is inversely proportional to the density of grafted chains, σ, where the grafting site of each chain is defined to be at the center of each cylinder face:

$$A_{chain} = \frac{1}{\sigma}. \tag{1}$$

The height of each cylinder is assumed to be equal to the thickness of the coating. Using an existing theory by de Gennes which assumes a step-function density profile, the thickness of a polymer brush t is scaled to the spacing between grafting sites, D:

$$t = N_m a \left(\frac{a}{D}\right)^{2/3} \quad (2)$$

where $N_m$ is the number of monomers in each chain (chain molecular weight divided by 44 Da per monomer for PEG) and $\alpha$ is the size of a single monomer (approximately 3 Å). In the model, the spacing between grafting sites is assumed to be smaller than the Flory radius of a free chain in solution ($R_F = \alpha N_m^{3/5}$) in order for the polymer to be in the brush structure regime. By examining the array geometry (see FIG. 2), it can be shown that D is substantially equal to the diameter of each cylinder cross-section and thereby related to $\sigma$ by equation (3):

$$D = \sqrt{\frac{4}{\pi\sigma}} \quad (3)$$

Using this equation we can calculate both the height and cross-sectional area of each cylinder with the same physically relevant parameter as shown in equation (4).

$$t = N_m a^{5/3} \left(\frac{\pi\sigma}{4}\right)^{1/3} \quad (4)$$

To simplify the model, it is assumed that there are no interactions between adjacent chains or between the nanoparticle and the substrate (e.g., van der Waals or other electrostatic forces). In this way, the compression of a single chain within the brush is reduced to a basic mechanical problem that involves the uniaxial compression of a linearly elastic rod. A simple rearrangement of Hooke's law provides the basis for the force-deformation relationship for each individual cylinder, i:

$$f_i = \left(\frac{EA_{chain}}{t}\right)\Delta z_i = \left[\left(\frac{4}{\pi}\right)^{1/3}\left(\frac{E}{N_m a^{5/3}\sigma^{4/3}}\right)\right]\Delta z_i \cong \left(\frac{1.08E}{N_m a^{5/3}\sigma^{4/3}}\right)\Delta z_i \quad (5)$$

where $\Delta z_i$ is a function of the cylinder's local position under the curvature of the spherical indenter. We consider that only those chains whose grafting site lies within the contact area, $A_{contact}$, can be compressed by the particle. To calculate the average number of chains compressed, N, for a given contact area, the process divides $A_{contact}$ by $A_{graftsite}$ (see FIG. 2, Top View) to account for the empty space between cylinders. Within $A_{graftsite}$ there are exactly three cylinders so N is given by equation (6).

$$N = \frac{\pi A_{contact}\sigma}{2\sqrt{3}} \quad (6)$$

Based on the problem of elastic contact outlined previously, $A_{contact}$ is a function of $\Delta z_{max}$ (the indentation distance at the apex of the indenter) as shown in equation (7), which is derived assuming a spherical indenter:

$$A_{contact} = \pi(R_C)^2 = \pi[R_{np}^2 - (R_{np} - \Delta z_{max})^2] \quad (7)$$

where $R_c$ and $R_{np}$ are the radii of the contact area and of the spherical nanoparticle, respectively. The Supporting Information section of this disclosure provides more detailed derivations of (6) and (7). Finally, by summing the force contributions of all chains compressed, the total force on the nanoparticle, $F_{np}$, can be obtained in equation (8):

$$F_{np} = \sum_{i=1}^{N} f_i = \sum_{i=1}^{N}\left[\left(\frac{4}{\pi}\right)^{1/3}\left(\frac{E}{N_m a^{5/3}\sigma^{4/3}}\right)\right]\Delta z_i = \sum_{i=1}^{N} k\Delta z_i \quad (8)$$

Examining the term in brackets, k, for congruence with phenomenological observations can give insight on the validity of the model formulation. Here k represents the stiffness of each cylinder, and one needs to inspect how it changes based on the physical properties of the coating. Observing equation (8), first consider the film modulus, E. It is reasonable to assume that the stiffness is directly proportional to E because the cylinder is of the same material as the bulk coating. It is important to note though that while E is a material property of the coating, k is not because its value changes with the amount of polymer under compression within each cylinder. As the coating thickness (the denominator term of k) increases, the cylinder stiffness decreases, which is reasonable considering previous studies characterizing the force-indentation curves of PEG brushes of different molecular weights.

Physically, an increase in the brush thickness is either a result of stretching the chains if the mass of the film is constant or of increasing the chain length (i.e., increasing MW, where the polymer is a linear chain of monomers). For the former case, stretching the chains would decrease the entropy of the system and is thus a nonspontaneous process that requires an input of energy. The more stretched a chain becomes, the greater is the deviation from its unstressed equilibrium state and the larger is the energy requirement for elongation. Likewise, it follows that contraction of an already stretched chain results in an increase in the chain entropy and is a spontaneous process that releases energy. Also a chain that is stretched to a longer distance should release more energy than a minimally stretched chain when compressed by a given distance towards its equilibrium length. In a brush structure, the lateral confinement of the grafted chains effectively results in their elongation away from the grafting surface because the only degree of freedom available for expansion is in the longitudinal direction. Compression of the brush thus returns the chains back to their unstretched state and should be easier with chains that are more stretched (i.e., thicker films). For the latter case, increasing the chain length would result in an increase in entropy of the system if the polymer chains were not confined to a particular footprint because the addition of monomers increases the chain's conformational degrees of freedom. Furthermore, as the chain length increases, so does its unconfined radius of gyration, $R_g$. However, imposing a constant lateral confinement on the chain to a footprint of $A_{chain}$ (similarly, maintaining a constant D) while increasing $R_g$ results in a decrease in entropy proportional to the difference between $R_g$ and D. Thus the same entropic argument used for stretching the chain in the constant mass case holds true here.

Figure 3A:
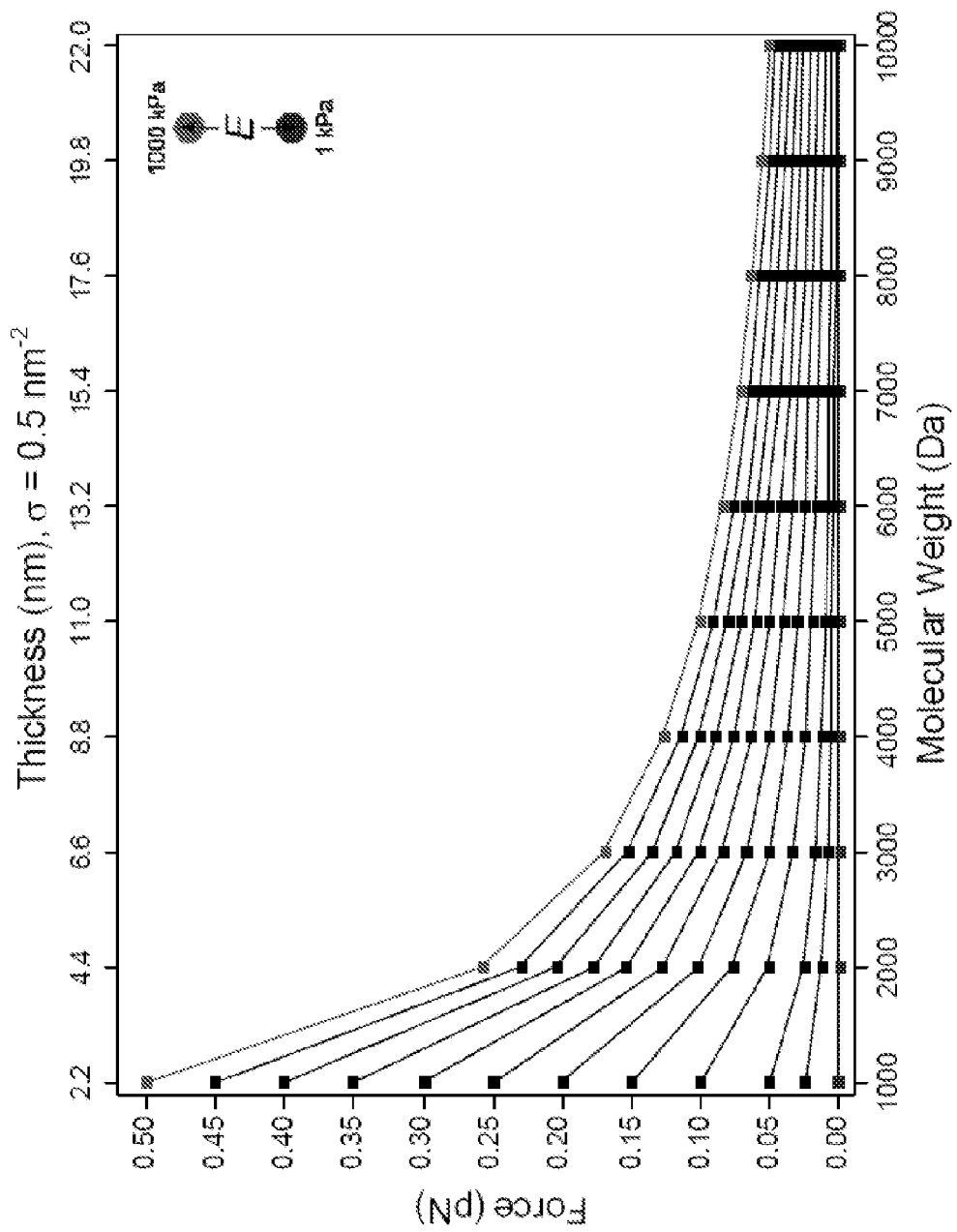
FIG. 3A shows the total force on a spherical nanoparticle (40 nm radius) required to compress 1 Å into a PEG brush coating as a function of molecular weight (or film thickness) of the chains in the brush for coatings of different elastic moduli.

The above-described trends can be depicted by a parameter sweep based on the formulated model as shown in FIG. 3A, which shows the total force on a spherical nanoparticle (40 nm radius) required to compress 1 Å into a PEG brush coating as a function of molecular weight (or film thickness) of the chains in the brush for coatings of different elastic moduli. As can be seen in FIG. 3A, increasing from blue curve to red curve: E={1, 50, 100:100:1000} kPa. The scale of the thickness axis can be dependent on the grafting density of the brush. The thickness equivalents of molecular weight are scaled for a density of 0.5 chains/nm$^2$. This result shows the theoretical force resolution of the device assuming a 1 Å displacement sensitivity. Multiple curves are shown for different moduli, and depending on the chain density of the brush the molecular weight can be scaled (e.g., using de Gennes theory) for an estimate of the brush thickness; which has been done here for a nominal chain density of 0.5 nm$^{-2}$ (see Methods section for a brief description of the general plotting technique).

A further examination of the chain density parameter in the model suggests that an increase in the grafting density causes a reduction in the stiffness of each chain (cylinder) and consequently a decrease in force on the nanoparticle for a given indentation distance. This contradicts what is observed experimentally, but studying the effects of varying a in the model requires a more thorough analysis to understand how this unexpected discrepancy arises in the model. First consider that a and t are proportional to one another as shown in equation (4). Increasing the grafting density elongates the chains relative to their unconfined conformation and increases the chain thickness, which leads us back to the results of the thermodynamic arguments described earlier for stretching a chain of constant molecular weight. The force required to compress each cylinder is also a function of its cross-sectional area as shown in equation (1). This trend is a result of the close-packed partitioning scheme employed in the model which requires that the cross-sectional area of each chain is inversely proportional to $\sigma$. It is reasonable to assume that the force required to compress a continuous material increases as the cross-section of the material increases if the stress applied is held constant. Substituting both equation (1) and (4) into the stiffness equation shows that k actually decreases faster with increasing a than it does with increasing thickness alone (with $\sigma^{4/3}$ for k versus $\sigma^{1/3}$ for t) as per equation (8).

Figure 3B:
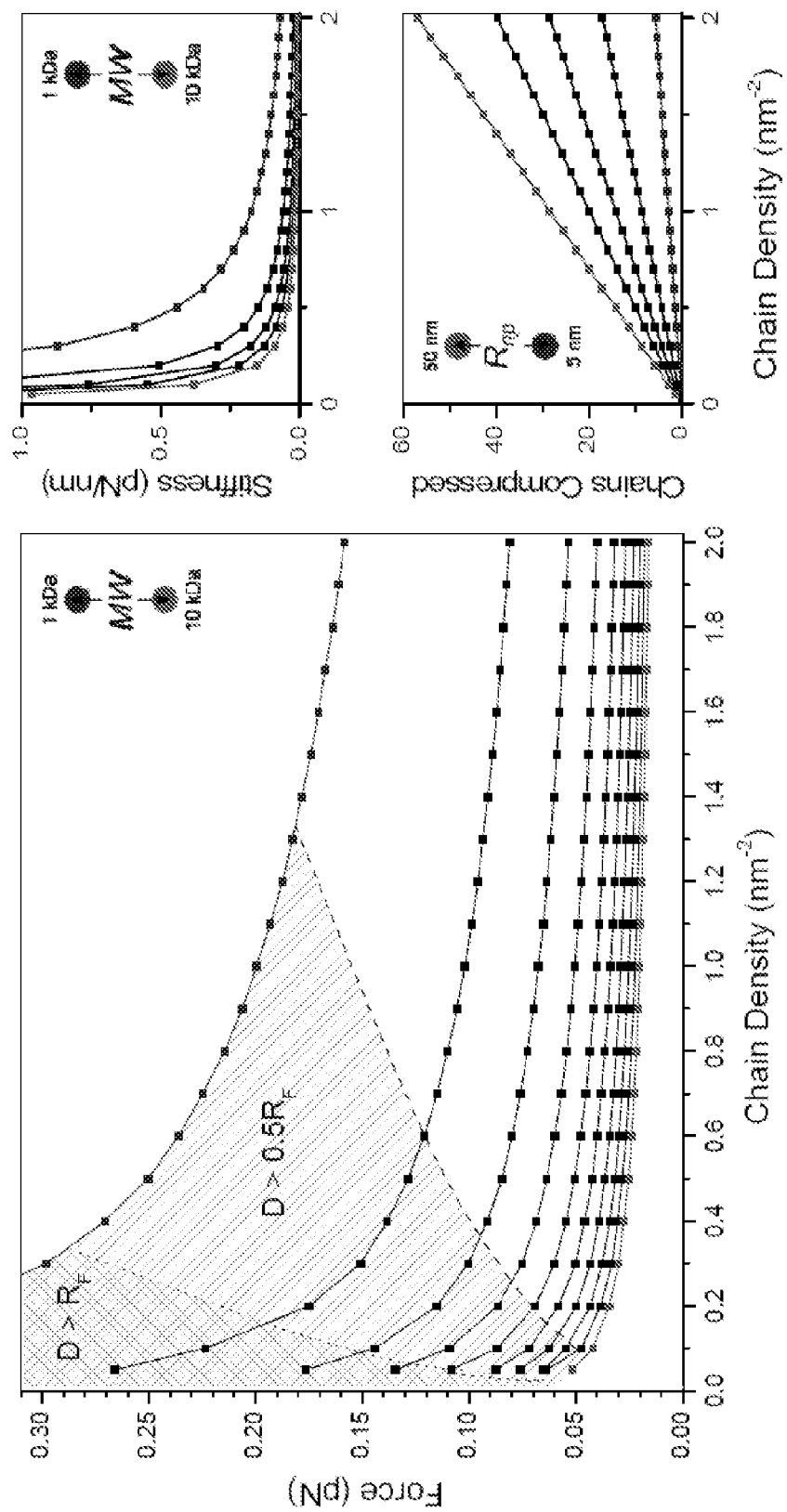
FIG. 3B shows changes in coating mechanical properties as a function of grafting density in accordance with some embodiments described herein.

FIG. 3B shows changes in coating mechanical properties as a function of grafting density in accordance with some embodiments described herein. The right, top plot in FIG. 3B shows that the overall chain stiffness decreases as $\sigma$ increases and that the stiffness at any given chain density increases with decreasing molecular weight. The right, top plot in FIG. 3B also shows that individual chain stiffness for coatings of varying MW (E=500 kPa) increases from blue curve to red curve: MW={1,3,5,7,10} kDa. What has not yet been accounted for is that the number of chains compressed, N, in a given contact area increases as the chains become more closely packed together.

The right, bottom plot in FIG. 3B shows that N is linearly proportional to the chain density and also increases with the radius of the indenter (see equation (6)). Total number of chains compressed for nanoparticles of different $R_{np}$ ($\Delta z_{max}$=1 Å) increases from blue curve to red curve: $R_{np}$={5, 15,25,35,50} nm. So while the stiffness of each chain decreases as the chain density increases, the total number of chains being compressed increases in the summation, representing two competing contributions to the total force acting on the nanoparticle transducer. However, because the per-chain stiffness decreases faster with increasing a than the number of compressed chains increases (regardless of MW or $R_{np}$), the force still has an overall decreasing trend as shown in FIG. 3B, left plot for coatings of varying molecular weight and an indenter radius of 40 nm. More specifically, the left plot in FIG. 3B shows force sensitivity of nanoparticle transducer as a function of chain grafting density for films of different PEG molecular weight (40 nm radius particle, $\Delta z_{max}$=1 Å) increases from blue curve to red curve: MW={1000:1000:10000} Da. The cross-hatched region indicates where the spacing between grafting sites, D, is greater than the Flory radius, $R_F$, and thus by de Gennes theory the polymer cladding is not in the brush regime and the model is not applicable. D>0.5$R_F$ is indicated by the line-shaded region and includes the D>$R_F$ region.

From the graphs in FIGS. 3A and 3B, it is evident that one of the main parameters of interest for tuning the mechanical properties of the coating and optimizing the transducer's force resolution is the chain molecular weight. The other physical parameters of the brush such as E, t, and $\sigma$ are generally difficult to control experimentally or cannot be independently adjusted without changing one of the other film parameters. For example, while the coating modulus is a direct way of improving the device resolution that is independent of the other parameters in the model, E is difficult to tune and predict accurately based on synthesis conditions. Changing the composition of the polymers in the brush may be one way to vary E without considering other coating options (e.g., PEMs or hydrogels), but may also require model adjustment to account for a different coating microstructure.

It can be shown that the coating thickness is intrinsically related to the molecular weight of the chains in the brush as well as the density of grafting sites, and that the force resolution improves as the thickness increases. Thickness, however, is a parameter that is impractical to use for predicting the mechanical properties of the transducer because it is difficult to measure experimentally, and any number of combinations of MW and $\sigma$ can result in the same thickness. Considering MW independently, it is a parameter that is known very different from (with error accounting for the polydispersity of the individual chain lengths) $\sigma$, which relies on the dynamics of the grafting reaction and should be calculated after synthesis based on brush thickness measurements and bulk material densities. Furthermore, MW can be easily tuned during the synthesis of the brush by simple choosing another commercially available chain of different length for the grafting reaction. FIG. 3A also shows that as the molecular weight of the brush increases, not only does the force resolution improve, but its variation as a result of different coating moduli decreases as well. Moreover, although the previous analysis of the grafting density highlighted a non-phenomenological trend in the model, an increasing molecular weight also correlates with smaller force variations with varying $\sigma$. In fact, considering that experimental ranges for the grafting densities typically lie between about 0.3 nm$^{-2}$ and 1.2 nm$^{-2}$, and that by the de Gennes restriction D must be smaller than $R_F$ (see FIG. 3B) to be in the brush regime, changes in force sensitivity due to variations in $\sigma$ are at most 20 fN (for D<0.5 $R_F$) and can be minimized by using a chain with a larger MW.

Despite of the above results, the molecular weight of the coating cannot be increased indefinitely because the 1 Å sensitivity of the device still relies on the proximity of the nanoparticle to the waveguide surface. Thus, the polymer coating thickness needs to be optimized, via chain molecular weight, to be sufficiently thin to yield the highest optical signal-to-noise ratio for the transducer, while still being thick enough to allow for a high force resolution that is not drastically altered by slight variations in the brush's elastic modulus or grafting density. If the coating is restricted to a maximum thickness of 15 nm, the longest brush that can be used (following equation (4) and assuming a minimum achievable grafting density of 0.3 nm$^{-2}$) is about 8000 Da.

For a thickness of 10 nm, the maximum molecular weight applicable in an exemplary system is about 5300 Da.

To validate the accuracy of the model for predicting force sensitivities of real PEG brush systems, AFM indentation experiments are performed on thin PEG films of various molecular weights. While we expect that the real force resolution of the device is still much smaller than can be verified by AFM measurements alone, here we aim for an order of magnitude estimate of the force sensitivity, which is within the capabilities of AFM. The moduli, grafting densities, and molecular weights of the real films are input back into the model and the theoretical curves are compared to the experimental data. The elastic modulus of each coating may be first calculated by fitting the indentation curves to another model developed by Dimitriadis. Chain grafting density can be calculated using the analysis described by Zdyrko while the required dry thickness measurements for the calculation are obtained by ellipsometry.

Figure 4A:
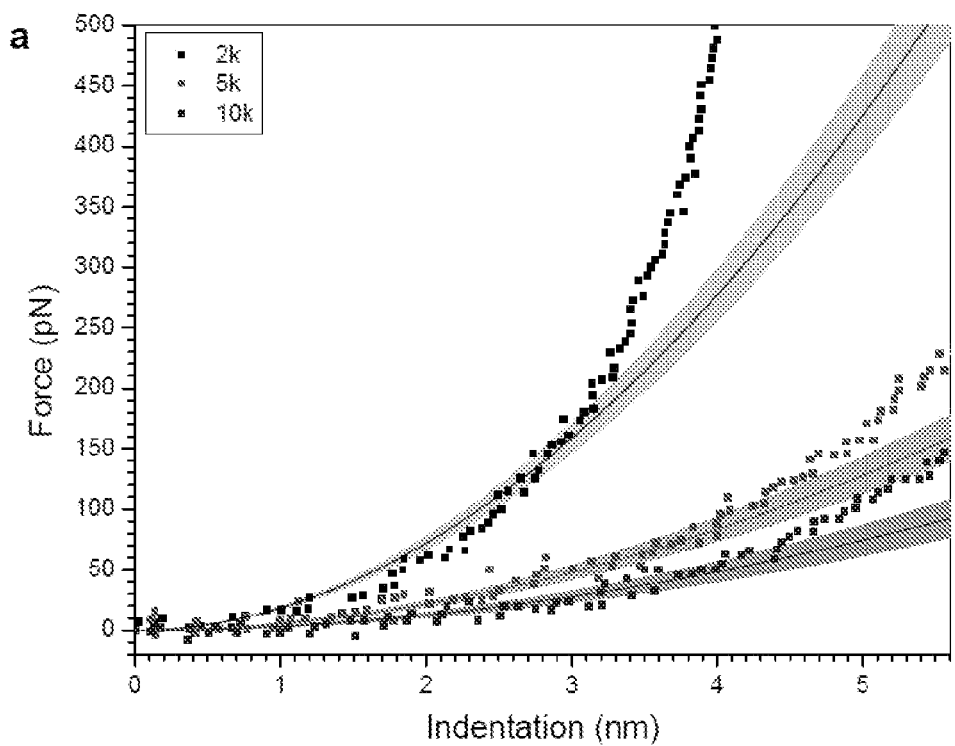
FIG. 4A shows force-indentation plots of 2k, 5k, and 10k MW PEG chains covalently grafted to $SiO_2$ substrates and their corresponding theoretically calculated indentation curves in accordance with some embodiments described herein.

FIG. 4A shows force-indentation plots of 2k, 5k, and 10k MW PEG chains covalently grafted to $SiO_2$ substrates (scatter plot) and their corresponding theoretically calculated indentation curves (lines) in accordance with some embodiments described herein. Force as a function of nanoparticle indentation into the PEG brush. AFM data shown as scattering points for 2k (black), 5k (red), and 10k (blue) molecular weight films. Experimental measurements were obtained using a 20 nm radius tip in 1×PBS buffer. Theoretical curves calculated using MW, experimentally calculated σ, and extracted film elastic moduli are shown as solid lines; with the colors correlating with the experimental data. The shaded region around each theoretical curve represents the model uncertainty based on the error associated with the modulus calculated for each film. The films were indented using a conical AFM tip with a 20 nm radius in a 1×PBS solution to minimize substrate effects on the cantilever. The shaded regions around each curve represent the uncertainty in the model results that stems from the error in the experimentally extracted elastic moduli of each film. A 20 nm indenter radius was also used in the theoretical calculation.

Figure 4B:
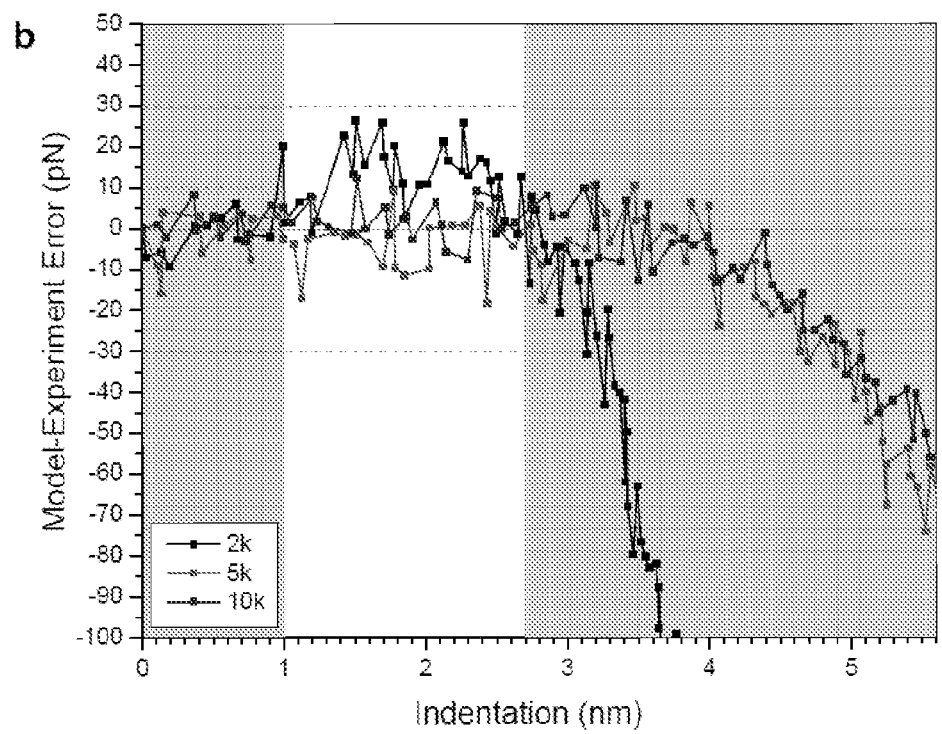
FIG. 4B shows the error between the theoretical curve from the model and the AFM experimental data, where the difference between the measured and calculated forces is plotted against probe indentation.

Comparing the experimental and theoretical force-indentation curves, the model accurately captures the relative magnitude trend of the force-indentation curves for the PEG based on the molecular weight of each film. Upon further inspection, the curves can be divided into three regimes based on the indentation distance into the film. FIG. 4B shows the error between the theoretical curve from the model and the AFM experimental data, where the difference between the measured and calculated forces is plotted against probe indentation. The solid horizontal line is zero error between the experimental curve and the model prediction. In the range of 0 to 1 nm indentation (shaded gray), the force error is generally smaller than the 10 pN force resolution of the AFM (dotted line). Above 2.7 nm (also gray), the errors of the 2k curve begins to decrease, showing an underestimation of the underlying physics of the system. Below a 2.7 nm indentation, the error of the model is within 30 pN (dashed line). This same underestimation is seen above a 3.5 nm indentation for the 5k and 10k curves (region not marked). For all molecular weights tested, the error is for the most part below 10 pN up to an indentation distance of 1 nm (left gray region). This is identified as the small indentation regime where the force sensitivity of the device will be high, but the optical readout will be more difficult due to the larger signal-to-noise ratio associated with particles farther from the waveguide surface. Because AFM data cannot accurately resolve forces smaller than this, it is difficult to use this technique alone to validate the force resolution of our proposed device experimentally (FIG. 4A shows that below a 1 nm indentation it is difficult to distinguish between the AFM curves of different molecular weight). However, with such a small discrepancy between the experimental and theoretical curves we are confident that the developed model provides a good estimate of the minimum force resolution of the proposed device.

At larger indentations, the AFM curves show a clear distinction between films of different MW. FIG. 4B shows that the error between the proposed model and the experimental data begins to become more negative for the 2k film above an indentation of 2.7 nm (right gray region) and for the 5k and 10k films, above an indentation of 3.5 nm (region not distinguished on plot). This increasingly negative error indicates that the physics of the model underestimates the true forces required of these indentations. Because the chain-chain and intra-chain steric repulsion within the film has been ignored in the model formulation for simplicity, this error is anticipated. Additionally, because of the partitioning scheme of the model, this high compression regime is not modeled as a truly continuous material, which could also contribute to the underestimation of the forces in this regime. This part of the graph is identified as the large indentation regime and it makes sense that the indentation distance to reach this part of the plot would be smaller for the 2k film than the longer 5k and 10k films because any indentation distance for the shorter brush constitutes a larger percentage of film compression compared to the longer brushes.

In the intermediate indentation region (white on the error plot) the 2k AFM curve is overestimated by the model while for the larger MW films the experimental forces are slightly underestimated. These discrepancies are not completely understood with regard to the physical mechanisms that cause the error, but these indentation distances represent the upper limit of our device's dynamic range. For the purpose of validating our proposed model, the small error of ±30 pN (dashed lines) is sufficient to estimate the forces required to operate our device in this regime where the signal-to-noise ratio will be high, but the force sensitivity lower.

Despite these experimental limitations for verifying the proposed model, the model can still be used to estimate the force resolution of the proposed nanomechanical force transducer to within 10 pN for small indentations and to within 30 pN at intermediate compressions. Moreover, the study shows that with the 1 Å distance sensitivity achievable by leveraging the plasmon-dielectric coupling effect, PEG brushes comprised of linear chains with less than 10 kDa molecular weight can be utilized to develop devices with force resolutions on the order of femtonewtons, exceeding the force resolution of tweezer systems. To analyze the full dynamic range of the force transducer further work must be done by adjusting the proposed model to account for steric repulsion within the brush structure and address electrostatic and other surface interactions between the substrate and the nanoparticle transducer. In either case, the platform should be highly tunable given the wide range of mechanical properties possible with the polymeric brush claddings.

In addition to the above-described experimental techniques for calibrating optical-mechanical force-sensing devices, simulations including finite element method (FEM) and FDTD can also be utilized to understand the plasmon-dielectric coupling effect in such devices, to predict forces (e.g., noise) on the nanoparticles induced by fluidic movement, and to evaluate sound/acoustic waves and pressure interactions with the plasmonic coatings.

As a first attempt to understand how plasmonic nanoparticle coatings respond to acoustic waves, and observe displacement of the nanoparticles induced from acoustic pressure, an FEM simulation is performed where a fiber waveguide device is treated as a pure mechanical system. For the simulation, a fiber is coated with a compressible coating similar to a PEG layer and a single gold nanoparticle is placed on or in the coating. The modulus of the PEG, size of the nanoparticle, frequency of the acoustic wave, and position of the nanoparticle within the compressible coating were all variables in the simulations.

FIG. 5 shows FEM simulated data of a sound wave interacting with a single nanoparticle embedded in a compressible coating that surrounds a nanofiber waveguide. The fiber is assumed to be placed in a water medium and a 1 Pa acoustic wave is applied onto the device. FIG. 5A shows total displacement vs. nanoparticle size for different nanoparticle positions within the compressible coating in accordance with some embodiments described herein. The total displacement is measured from the point at the bottom of the nanoparticle (see FIG. 5B) and moves towards the waveguide surface as the acoustic wave travels from top to bottom. The sound pressure and frequency are 1 Pa and 10 kHz, respectively. As indicative in FIG. 5A, there is a noticeable difference in the displacement depending on how deep the nanoparticle is immersed in the compressible coating. In this data the compressible coating has a Young's modulus of 50 kPa, the acoustic wave has a frequency of 10 kHz, and the film thickness is allowed to change so that the distance between the bottom of the nanoparticle and the top of the waveguide surface is kept constant at 20 nm. The increase in displacement is likely caused by thicker compressible coating, since a larger immersion (or larger nanoparticle size) requires a thicker coating to maintain the 20 nm gap.

FIG. 5B shows images of total displacements for different sized nanoparticle embedded at various depths in the compressible coating in accordance with some embodiments described herein. Red and blue indicates the largest and smallest displacements, respectively. The colors should not be used to compare between different images in FIG. 5B because the scale changes depending on size of the nanoparticle and thickness of the compressible layer. The displacement images in FIG. 5B for different sized nanoparticles and placement clearly show that the larger displacement is occurring near the surface of the polymer, which is expected because the wave is traveling from the top down and the top molecules can move with larger amplitude. In these images the color (red being the largest displacement, and dark blue being the smallest) indicates the total displacement at that point.

FIG. 5C shows total displacement vs. nanoparticle diameter for compressible coatings with and without thin (e.g., 100 nm) silica coatings in accordance with some embodiments described herein. The silica coating is deposited on top of the PEG coating. The data in FIG. 5C shows that when a harder silica layer is placed on top of the PEG layer, the displacement increases by nearly a factor of two (0.7 to 1.35 µm). FIG. 5D shows total displacement change vs. nanoparticle diameter for the silica coated PEG layer system in accordance with some embodiments described herein. Data is shown at two different values for the Young's modulus of the PEG layer. The data in FIG. 5D shows that the displacement can be further enhanced by lowing the Young's modulus of the compressible coating, which scales linearly with the mechanical properties of the coating. This result suggests that the response of nanoparticle transducer is highly tunable, but not significantly dependent on the size of the nanoparticle. The entire layer interacts with the acoustic layer and the nanoparticles are just present to provide feedback on their position within the evanescent field. The simulated displacements are relatively small for a 1 Pa sound pressure, in the picometer range, but the response of multiple particles can be used to enhance the signal modulation even at extremely small sound pressures. Because 10s to 100s of particles may be located in the active region of the sensor, the cumulative (in-phase) movement of the nanoparticles in response to the acoustic signal could push the signal level above the noise level even at pascal or sub-pascal sound pressures.

In summary, the proposed optical-mechanical force transducer is capable of providing angstrom-level distance sensitivity and femtonewton force resolution. The platform operates by tracking small plasmonic nanoparticles scattering in the evanescent field of subwavelength optical waveguides. The strong plasmon-dielectric coupling effects occurring between the nanoparticle and waveguide enhance the spatial sensitivity by over an order of magnitude compared to materials that only track the power in the near-field. Thin (<15 nm), compressible coatings such as PEG, hydrogels, or PEMs can provide the mechanical feedback for the nanoparticles. To help predict the force resolution of the system, a mechanical model is developed for a PEG brush coating that treats each coating molecule as a compressible spring and relates the compression of the coating layer by a nanoparticle to the molecular weight, grafting density, and elastic modulus of the linear chains that comprise the cladding. The model was compared to experimental nano-indentation traces on different molecular weight films using AFM. The trends predicted with the model agreed well with the AFM traces for small and intermediate indentations up to about 2.7 nm, but the theoretical curves deviated from the experimental data in the non-linear, large indentation regime. This is likely due to the inter- and intra-molecular forces that were not included in the model formulation. However, in the linear regime (which is where the transducer would be calibrated and used) these effects are minimal and the model provides a reliable tracking the forces required to indent a nanoparticle and provides a realistic lower limit for the resolution of the system. Also extracted from the model is that molecular weight is the key physical property that is translatable to the synthesis of PEG coatings and ultimately tuning the force response of individual nanoparticles. Each nanoparticle acts as its own independent force transducer, and the molecular weight can be tuned to optimize the cladding stiffness and thickness for different force regimes to detect forces ranging from femtonewtons to nanonewtons. Therefore, not only can the proposed transducer achieve higher force resolutions, but it can also access larger dynamic ranges than either optical/magnetic traps or AFMs alone.

Exemplary Materials and Modeling Process

Process for Mechanical Model Simulation: Briefly, in the computational algorithm for the parameter sweeps, first the $A_{contact}$ was calculated based on the indentation distance, $\Delta z$ (here 1 Å). Then the coordinates of the first grafting site were selected randomly and, depending on the specified grafting density, the rest of the grafting sites in the close-packed hexagonal array were calculated relative to that initial randomly selected point. $\Delta z_i$ was then determined for each cylinder based on its position relative to the center of $A_{contact}$ assuming that at this center point Åz was equivalent to the indentation distance and the nanoparticle had a spherical cap shaped indentation profile. Once $\Delta z_i$ was calculated for each chain whose grafting site was within $A_{contact}$, the force to compress each chain was calculated by multiplying each chain indentation by the chain stiffness, k. Finally the total force for indentation was calculated by summing the forces required to compress each chain individually. Because of the random nature of selecting the initial grafting site coordinates, the average total force was reported for 100 iterations of this algorithm. To check the program, the average total number of chains compressed within $A_{contact}$ was compared to the theoretical value of N calculated from equation (6).

Polyethylene Glycol Films: PEG was covalently attached to a silicon chip via a silane coupling reaction to form a uniform, thin compliant brush. First silicon wafers (111) were cleaned in piranha solution ($H_2O_2$:$H_2SO_4$ in a 1:3 ratio) at 90° C. for 10 minutes then etched in HF for 5 minutes to completely remove the original surface oxide layer. The cleaned chips were subsequently soaked in RCA 1 solution ($NH_4OH$:$H_2O_2$:$H_2O$, 1:1:5) then RCA 2 solution (HCl:$H_2O_2$:$H_2O$, 1:1:5) at 70° C. for 10 minutes in each solution respectively to produce a clean native oxide. Each wafer was then rinsed with milliQ water and dried with nitrogen. Prior to synthesis, the cleaned chips were treated with oxygen plasma. Then the silicon oxide surface was allowed to react with 0.2 mM PEG-silane of a given molecular weight (brushes comprised of chains with MW=2k, 5k, and 10k Da were synthesized on different chips; PEG-silane was purchased from Laysan Bio) in an anhydrous toluene solution. The reaction was performed in a dry, air-protected glove box at 50° C. overnight. 0.1% v/v concentrated HCl was also added to the toluene solution as a catalyst. After the overnight reaction, the chips were rinsed in a series of toluene, acetone, methanol, and milliQ water, then dried with nitrogen and stored in the glove box until AFM measurements were performed. Aside from the PEG-silane, all other reagents and solvents used for the brush synthesis were purchased from Fisher Scientific.

AFM Characterization: A multimode AFM (Veeco Nanoscope IV) was used to carry out force-indentation experiments in contact mode in 1xPBS to minimize electrostatic interactions between the cantilever tip and the substrate. The radius of the tip was determined by contact imaging sharp features on an RS-12 standard sample from Bruker[39,40] and measured to have a radius of approximately 20 nm. The spring constant of the cantilever was determined via the thermal tune method done on a separate Veeco Nanoscope V controller AFM. The compressible region of the obtained polymer indentation curves were then fit to the model developed by Dimitriadis et al. to back out the elastic moduli of the different brushes synthesized. To experimentally determine the grafting density of the brush, the dry film thicknesses were required. Thickness measurements were made via ellipsometry. The system's optical sensitivity was assessed by indentation measurements on a piranha-cleaned silicon surface in the buffer solution. Surface contact was determined to be the point at which the standard variation of the force-indentation curve was larger than 10% of the noise level in the flat region of the curve representing the system noise during the cantilever probe's approach to the sample. These uncertainties are reflected in the error associated with the extracted moduli of the different films.

Experimental Mapping of Evanescent Field Decay of Subwavelength Optical WGs

The ability to observe, measure, and manipulate individual molecular interactions is highly important to the understanding of complex chemical pathways, interfacial dynamics and biological processes. Detailed single molecule analyses of conformational changes, intramolecular distances, and/or adhesion forces are typically carried out by techniques such as optical tweezers, atomic force microscopy, Förster energy transfer schemes, and other molecular ruler platforms. However, a system that can combine optical spectroscopy with nano-mechanical manipulation, while approaching the size of the systems being interrogated, can help push single molecule analytics beyond current state-of-the-art techniques. It is therefore necessary to investigate new materials and devices that have potential of integrating optics with mechano-chemistry, in particular if the system can reduce the size of the transducer and offer a direct means of delivering optical energy to the molecular system of interest.

In some implementations, to understand the capabilities of using the near-field of a mode-supporting photonic cavity to monitor molecular distance, one can investigate light-matter interactions in the evanescent field of subwavelength optical waveguides (WGs). One-dimensional dielectric nanowires offer an excellent platform to study near-field effects because they have free-standing structures that can be easily integrated with microfluidics, can propagate light in highly confined cavities over large distances, and have tunable dimensions. Furthermore, compared to other total internal reflection (TIR) mechanisms, optical fibers can be engineered as mobile probes and be inserted into systems to provide a distinct advantage for in situ or multidimensional analysis. Various materials have been used in the fabrication of subwavelength optical WGs, including semiconductors, glasses, metals, and polymers. For example, single-crystalline semiconductor tin dioxide ($S_nO_2$) WGs can be used to carry out the evanescent wave experiments because of their large index of refraction (n=2.1, for visible wavelengths), wide band gap ($E_g$=3.6 eV), and the relative simplicity for creating biofunctional coatings within the decaying optical field.

In some implementations, techniques for experimentally mapping out the decay of the evanescent field of subwavelength optical WGs involve using self-assembled polyelectrolyte multilayer (PEM) coatings (n~1.3-1.5) to incrementally space a fluorescent probe away from the WG surface with nanometer resolution. The decay constant of 18 nm matched well with the 20 nm decay determined by finite-difference time-domain (FDTD) simulations and validated that fluorescent optical structures or optical transmitters could be used to provide a distance sensitivity of 0.8±0.2 nm (in air). Individual fluorescent chromophores can be used to produce strong optical signals within the evanescent field, but fluorescent particles such as quantum dots show intermittent fluorescence (i.e., blinking behavior), and fluorescent dyes undergo photochemical degradation under prolonged illumination in oxygen environments. This makes intensity vs distance correlations extremely difficult. To go beyond fluorescent-based experiments and enhance the sensitivity of the platform, light-matter interactions using plasmonic nanoparticles embedded in the near-field of the nanofibers may be used.

Figure 6A:
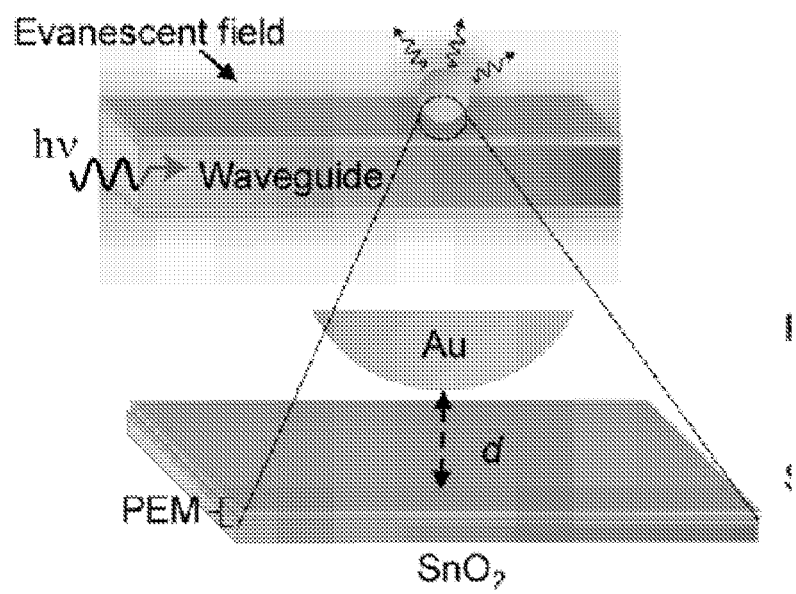
FIG. 6A illustrates schematic of distance sensing configuration by exciting and collecting signal from individual Au nanoparticles embedded in the evanescent field of a waveguide in accordance with some embodiments described herein.

FIG. 6A illustrates schematic of distance sensing configuration by exciting and collecting signal from individual Au nanoparticles embedded in the evanescent field of a waveguide in accordance with some embodiments described herein. When a plasmonic nanoparticle (e.g., gold, silver) capable of strongly interacting with the guided optical frequencies enters the evanescent field, the WG treats the particle as a defect, and photons are expelled from the cavity. These large optical signals are generated predominantly by elastically scattered photons in resonance with the plasmon resonance of the nanoparticle. Furthermore, in addition to being stronger emitters, plasmonic nanoparticles do not show emission-induced decay in their optical signals, or photobleaching, a problem that plagues many organic fluorescent emitters.

Figures 6B, 6C:
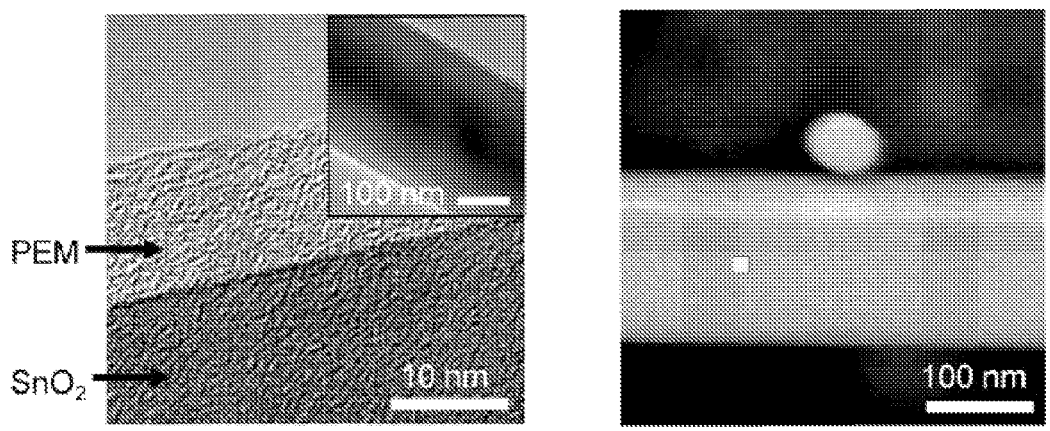
FIG. 6B presents a high-resolution transmission electron micrograph (with a low resolution inset) showing a waveguide (WG) coated with 11 PEM layers in accordance with some embodiments described herein.
FIG. 6C presents a scanning electron micrograph showing a single Au nanoparticle sitting on a SnO2 nanofiber WG having a cross-sectional dimension of 200 nm wide×200 nm thick in accordance with some embodiments described herein.

To experimentally map out the scattering intensity of plasmonic nanoparticles embedded in the evanescent field, self-assembled polyelectrolyte (PEM) coatings are used to incrementally move individual 80 nm Au nanoparticles away from the WG surface. The PEM coatings are ideal spacers because they are optically transparent, provide uniform and conformal films, and offer nanometer resolution (e.g., 2.3 nm per bilayer) in controlling the thickness of the film. FIG. 6B presents a high-resolution transmission electron micrograph (with a low resolution inset) showing a WG coated with 11 PEM layers in accordance with some embodiments described herein.

Referring back to FIG. 6A, note that a nanofiber WG with average cross-sectional dimensions of 200 nm wide×200 nm thick is suspended over 25 µm×4 µm deep $SiO_2$ microchannels and clamped on the substrate with polydimethylsiloxane (PDMS). Poly(ethylenimine) (PEI) was deposited on the precleaned $SnO_2$ WGs as the priming layer, and poly(allylamine hydrochloride) (PAH) and poly-(sodium 4-styrene sulfonate) (PSS) were deposited as the alternating polycation and polyanion, respectively. PAH was used as the final polycation film for stabilizing the interactions between the nanoparticles and WG due to the negatively charged metal surface. The WG devices were submersed in the diluted Au nanoparticle solutions until individual nanoparticles were attached to the surface without aggregation. FIG. 6C presents a scanning electron micrograph showing a single Au nanoparticle sitting on a SnO2 nanofiber WG having a cross-sectional dimension of 200 nm wide×200 nm thick in accordance with some embodiments described herein.

To launch white light down the WG cavity, the 325 nm line of a helium cadmium (HeCd) laser was focused on one end of the WG. The above band edge light from the HeCd laser generates broad defect (e.g., oxygen vacancies) emission which is confined and guided down the SnO2 crystal. All scattering measurements were recorded while the WG was submersed in water. Multiple data points were taken for each distance by stripping off the PEM coatings (more detail of this step is provided below) and redepositing the spacer layer.

Figure 7A:
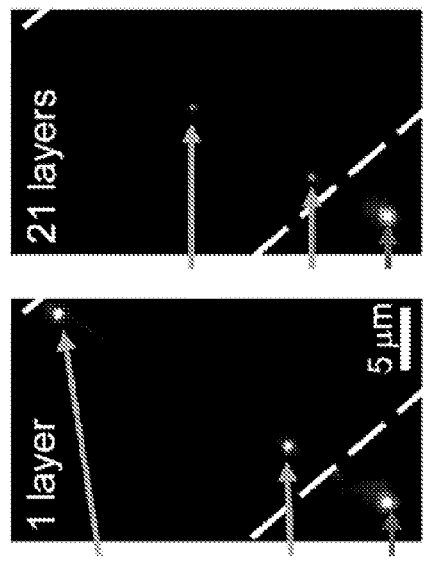
FIG. 7A presents optical images of individual Au nanoparticles scattering in the evanescent field after depositing 1 (left image) and 21 (right image) polyelectrolyte layers in accordance with some embodiments described herein.

Compiled scattering intensities and spectra from the nanoparticles as a function of separation are plotted in FIG. 7, which show distance-dependent scattering of plasmonic Au nanoparticles in the evanescent field of SnO2 WGs. FIG. 7A presents optical images of individual Au nanoparticles scattering in the evanescent field after depositing 1 (left image) and 21 (right image) polyelectrolyte layers (green arrows) in accordance with some embodiments described herein. The WG is suspended over a 25 µm silica channel that has edges highlighted by the white dashed lines. The bright spot in the bottom left corner in each image is the output of the WG (pointed by violet arrows).

Figure 7C:
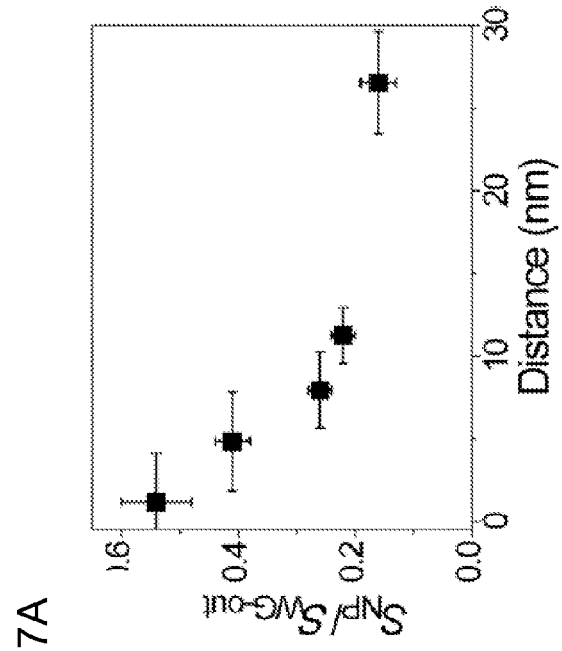
FIG. 7C shows the relative scattering intensity of individual Au nanoparticles (normalized by the end facet scattering intensity of the WG) as a function of polyelectrolyte spacer thickness in accordance with some embodiments described herein.
Figure 7B:
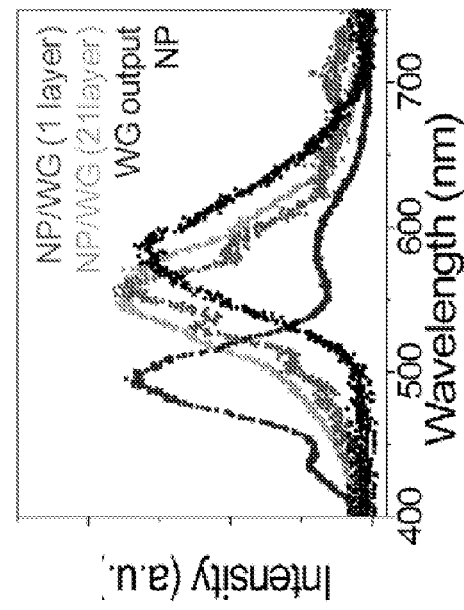
FIG. 7B shows normalized spectra captured from the WG output (blue trace), a single Au nanoparticle (NP) sitting on indium tin oxide (ITO) excited under dark-field illumination (black trace), and a single Au nanoparticle excited with the evanescent field of a SnO2 WG after depositing 1 (red trace) and 21 (green trace) polyelectrolyte layers in accordance with some embodiments described herein.

FIG. 7B shows normalized spectra captured from the WG output (blue trace), a single Au nanoparticle (NP) sitting on indium tin oxide (ITO) excited under dark-field illumination (black trace), and a single Au nanoparticle excited with the evanescent field of a SnO2 WG after depositing 1 (red trace) and 21 (green trace) polyelectrolyte layers in accordance with some embodiments described herein. The spectra taken from individual nanoparticles (red and green traces in FIG. 7B) show that wavelengths close to the plasmon resonance of the nanoparticle are dominantly scattered out of the WG as compared to the WG output spectrum (blue trace in FIG. 7B). There is a slight blue shift ($\lambda_{peak}$~570 nm) for the nanoparticles excited with the evanescent field, compared to the dark-field spectrum ($\lambda_{peak}$~590 nm), which is likely caused by the guided frequencies of the WG ($\lambda_{peak}$<500 nm). In addition, sharper features appear in the spectrum when the nanoparticle is closer to the WG core. This is due to the nanoparticle's stronger interaction with the guided modes which often have strong modulation due to interference of the electromagnetic waves resonating within the rectangular cavity.

FIG. 7C shows the relative scattering intensity of individual Au nanoparticles (normalized by the end facet scattering intensity of the WG) as a function of polyelectrolyte spacer thickness in accordance with some embodiments described herein. Each data point is the average of multiple (3-5) runs where the PEM was cleaned and redeposited each time. More specifically, FIG. 7C shows the relative scattering intensities of individual nanoparticles $S_{NP}/S_{WG-out}$ (where $S_{NP}$ and $S_{WG-out}$ are the raw intensities of the nanoparticle and waveguide output, respectively) are plotted against gap separation. The excitation angle (~45° relative to the substrate surface) and the collection optics were held constant during the experiments which allows for to remove any power fluctuations in the system by simply monitoring the output intensity simultaneously. The data show a much faster decay (τ~5 nm) when the separation is below 10 nm compared to the evanescent field alone which follows $|E|^2$ (τ~46 nm). Profiling experiments were carried out on multiple WGs with comparable dimensions, and all had similar intensity profiles.

The 10× optical signal enhancement in sensitivity show in FIG. 7C is partially due to the dipole and induced dipole interaction between the gold nanoparticle and SnO2 nanofiber. For nanoparticles above a dielectric substrate, the influence of the substrate manifests itself through the screening of the electromagnetic fields that provides the restoring force in the plasmon oscillation. The screening induced by the dielectric surface is equivalent to the potential generated by a nanoparticle's image, with the magnitude of the substrate image (β) being equal to $(\in_s-1)/(\in_s+1)$ where $\in_s$ is the permittivity of the substrate. When the transverse magnetic (TM) mode (parallel to the interaxis of the nanoparticle and perpendicular to the WG surface) is used to excite the nanoparticle, the dipole and induced dipole interaction is strongly enhanced as the nanoparticle comes closer to the WG surface. This enhancement can be described by the increase of the effective polarizability of the nanoparticle defined as $\alpha_{eff}=\alpha(1+\beta)/(1-\alpha\beta/16\pi(r+d)^3)$, where a is the polarizability of an Au nanoparticle in free space, r is the radius of the nanoparticle, and d is the separation between the nanoparticle and the WG surface. Thus the scattering cross-section of the nanoparticle, which is proportional to $|\alpha_{eff}|^2$ assuming Rayleigh scattering from the nanoparticles, can be strongly enhanced by the dielectric surface. This enhancement is also sensitive to the size of the nanoparticle where larger nanoparticles typically show a weaker decay. Similar scattering effects have been observed in apertureless near-field optical microscopy.

Because the guided power is extracted out of the WG cavity by the plasmonic Au nanoparticle, the reduction of guided power can become significant enough that it makes it difficult to profile the scattering of the nanoparticle. To better understand this effect, scattering intensity from both small (80 nm) and large (150 nm) nanoparticles were analyzed. When small nanoparticles attach to the WG, there is no significant drop in the guided power ($S_{WG-out}$) except for fluctuations coming from coupling the laser into the WG. Because the guided power is much larger than the extracted signal, profiling can be performed even when multiple nanoparticles are attached to the WG surface. When larger nanoparticles (150 nm) are used, the total guided power is more significantly reduced, and the competing scattering signals suppress the output enough to accrue larger errors in the profiling data when multiple nanoparticles are attached to the cavity. These data also support the capability of tracking light-matter interactions with a transmission mode, in addition to the more sensitive mode of measuring the scattering signal directly, which would be ideal for sensing or microscopy applications that used the nanoparticle transducers for feedback on distance and/or forces deep inside of a material.

FDTD Simulation of the Evanescent Field Decay of Sub-wavelength Optical WGs

FDTD simulations are used to simulate the similar geometries to compare with the experimental data where an 80 nm Au nanoparticle was positioned at different heights within the evanescent field. FIG. 8 shows near-field interaction of a plasmonic nanoparticle adjacent to a dielectric WG. More specifically, FIG. 8A shows a schematic of the configuration of the 3D FDTD simulations of an individual Au nanoparticle disposed on a WG in accordance with some embodiments described herein. The nanoparticle is being excited with the TM mode at λ=570 nm, and the WG is in water. TM polarized (y-axis in FIG. 8A) 570 nm light, which matched the local surface plasmon resonance of the gold nanoparticle, was launched into the WG (dimensions: 200 nm wide×200 nm thick) which allowed the power (time-averaged Poynting vector) distribution near the WG to be mapped out with and without the nanoparticle. FIG. 8B shows YZ cross-sectional power distributions of the nanoparticle adjacent to the WG surface at different gap separations (from 0 to 30 nm) in accordance with some embodiments described herein. The inner part of the Au nanoparticle was artificially colored black (zero power) to remove internal field intensities from the integration step. The blue dashed lines indicate the boundary of the nanoparticle and WG surface.

FIG. 8C shows normalized scattering intensity of single Au nanoparticles, calculated by the FDTD (red) calculations and polyelectrolyte (black) experiments, as a function of WG-nanoparticle separation in accordance with some embodiments described herein. The data were fit to double exponential decays, which gave time constants of $\tau_1$=4.8 and $\tau_2$=46.0 nm for the FDTD simulations and $\tau_1$=4.5±2.5 nm and $\tau_2$=46.0 nm for the polyelectrolyte experiments. The green dashed line indicates the decay of the evanescent field of the WG in water ($\tau$=46.0 nm). Note that without the nanoparticle present the guided modes are strongly confined within the WG core and drop off very slowly outside the cavity ($\tau$=46 nm). Once a plasmonic nanoparticle enters the evanescent field, an enhanced field forms near the interface between the nanoparticle and the WG surface. The power values inside of a defined interfacial area of 20×40 nm between the WG and nanoparticle were integrated at different gap separations to describe the decay of the induced field by the dipole and induced dipole interaction (FIG. 8C, red solid line). The calculated decay was fitted with a double exponential decay ($\tau_2$ was fixed at 46 nm for the decay of $|E|^2$), which gave a decay constant of $\tau_1$=4.8 nm. The experimental data were also fit, which gave a decay constant of $\tau_1$=4.5±2.5 nm using $\tau_2$=46 nm, which matches well with the FDTD simulations. Further refinement of the plasmon-dielectric coupling (e.g., nanoparticle shape/composition/size, guided frequencies, polarization control) should enable the scattering to be even more sensitive to distance.

The light confinement and near-field profile of the WG cavity could be modified as the polyelectrolyte coating (n~1.45), which has a higher index than the medium (n~1.35), is thickened up to 30 nm To investigate this effect, we carried out simulations and experiments with WGs submersed in different indices. According to the FDTD simulations, strongly confined modes within the cavity of the $SnO_2$ (n~2.1) are not sensitive to the polyelectrolyte coatings, and the near-field profile of the WG shows only a small difference (~2%) between the decay constant of the bare WG and the 30 nm polyelectrolyte-coated WG. To understand the effect that the medium's index of refraction has on the relative scattering intensities from the plasmonic nanoparticles, we experimentally measured the signal in different indices where most biological mediums span (n=1.33 to 1.44). Figure S6 plots the scatting intensity of Au nanoparticles sitting on a WG coated with a PEI layer and three PAH/PSS bilayers in different sucrose mixtures. No significant variation in the scattering intensities was observed, which validates that the high index contrast $SnO_2$ WGs are not significantly influenced by the medium index and can be used for fluidic and/or biological applications without further correction or calibration.

To demonstrate the efficacy of the nanowire-nanoparticle system as a molecular ruler, and confirm the extremely high displacement sensitivity of the plasmon-dielectric coupling effect, we tethered 80 nm gold nanoparticles to the WG and imparted a force on the nanoparticles via fluid flow. FIG. 9 shows detecting single molecular displacement using a DNA-lipid membrane tether.

More specifically, FIG. 9A shows a schematic of the molecular tether between a Au nanoparticle and $SnO_2$ WG under fluid flow in accordance with some embodiments described herein. FIG. 9B shows a schematic of the molecular tether between an Au nanoparticle and $SnO_2$ WG with no flow in accordance with some embodiments described herein. The linkage consists of a 1,2-dioleoyl-sn-glycero-3-phosphocholine (DOPC) WG-supported lipid bilayer, biotin-streptavidin-biotin sandwich, and a 25 base pair single-stranded oligonucleotide. The tether system chosen consisted of a 25 base-pair ssDNA molecule, biotin-streptavidin sandwich, and a lipid bilayer. Once the nanoparticles were linked to the WG, the scattering intensity could be monitored as a function of fluid flow.

FIG. 9C illustrates one trace of a single nanoparticle as the fluid pump is cycled between an "on" (10 mL/hour flow rate) and "off" state in accordance with some embodiments described herein. More specifically, the lower plot in FIG. 9C shows intensity timecourse of a single Au nanoparticle linkage while the fluidic flow rate is cycled between "on" (~10 mL/hour) and "off" three times. The WG is suspended across a 50 μm wide by 30 μm deep channel and is positioned so that the cavity is in the middle (15 μm below the top glass coverslip) of the channel. The upper plot in FIG. 9C shows intensity time course of a single nanoparticle positioned outside of the flow stream (near the channel edge) while the flow is cycled between the "on" and "off" conditions. It is clear that under flow the intensity increases by approximately two times and the peak-to-peak height of the rapid oscillations diminish significantly, suggesting the flow is compressing the tether and limiting the degree of nanoparticle movement when the particle is close to the WG surface (see FIG. 9A). When the pump is turned "off", the base level intensity is drastically reduced, and strong oscillations can be observed that peak ca. 80% to that of the average "on" levels. Because the tether is in a more relaxed state, and the fluidic forces impinging on the nanoparticles do not cease completely due to Brownian motion of the particles, the nanoparticles can move more freely near the surface of the WG. The difference in the baseline "off" signals results from the nonzero flow (i.e., time lag for flow to completely stop) still remaining in the channel. In comparison to an intensity trace (upper trace in FIG. 9C) of a nanoparticle sheltered from the fluidic flow (i.e., particle near the channel wall), it is evident that the peak-to-peak oscillations are significantly less than that observed from exposed nanoparticles. This gives a good estimation for the noise of the system which has an root-mean-square (rms) value of 0.006, or a displacement resolution of 1.2±0.3 Å when calibrated with the profiling data in FIG. 7. Finally, FIG. 9D shows schematics of a tethered nanoparticle under different fluidic flows (flow "on" vs flow "off") in accordance with some embodiments described herein.

Given the persistent length of the DNA tether (~8.5 nm), the size of the streptavidin (~4.5 nm), and thickness of the DOPC bilayer (~4 nm), the degree of modulation in the scattering signal agrees well with the profiling data shown in FIGS. 7 and 8. A 50% increase in the scattering signal translates to a ca. 13 nm decrease in distance between the nanoparticle and WG surface considering the initial gap separation of 4 nm due to the lipid bilayer. It is possible that the signal from the "on" state is enhanced by the nanoparticle compressing the lipid bilayer. However, assuming laminar flow around the nanoparticle and a spherical shape, the drag force acting on the nanoparticle is estimated to be only 15 pN using Stokes law. With this nanoparticle force the DOPC lipid bilayer would only be compressed by ~0.1 nm using an average literature value of $7 \times 10^8$ dyn/cm$^2$ for the Young's modulus of a DOPC membrane. Because the average nanoparticle-WG distance of the lipid/DNA tether falls near the bottom of the plasmon-dielectric decay plot, it suggests that the distance sensitivity of this particular system is larger when the particle moves closer to the WG. However, the distance sensitivity should be tunable since it strongly depends on the polarization of light, wavelength of guided light, as well as the shape/size of the nanoparticle.

Hence, a novel nanophotonic system that has the capability of measuring molecular displacements with angstrom level sensitivity has been demonstrated. Both fluorescent and plasmonic-based optical structures or optical transmitters interacting with the evanescent field can be used to detect fine movements perpendicular to the propagation of light, but a ~10× enhancement in sensitivity (in liquid) can be achieved when plasmon-dielectric coupling effects are utilized. The use of free-standing nanofiber WGs decorated with plasmonic nanoparticles to measure molecular displacements has distinct advantages over current scan probe, molecular ruler, and tweezer technologies including the analysis of multiple transducers simultaneously, the ability to insert the probe in local environments (e.g., cells), the capacity to combine optical with mechano-chemistry measurements, and the detection response of the transduction mechanism is highly tunable. Further understanding on how to chemically encode the nanofibers and achieve force feedback on molecular activity should generate a new analytical tool for studying force dependent processes, imaging at the nanoscale and quantifying individual molecular binding dynamics.

Profiling the Evanescent Field of Nanofiber Waveguides Using Self-Assembled Polymer Coatings A technique for quantifying the decaying evanescent field surrounding free-standing nanofiber waveguides using thin self-assembled polyelectrolyte coatings and fluorescent optical structures or optical transmitters is provided. Using the proposed technique, the optical intensity as a function of distance with nanometer resolution is achieved.

Quantifying the exponential decay of the optical field near a dielectric or metal surface is extremely useful in the design of analytical instrumentation such as surface plasmon resonance (SPR), total internal reflection microscopy, near-field optical microscopy, and fiber optic sensors which rely on the evanescent field for imaging and/or sensing transduction mechanisms. In addition, if the optical decay can be leveraged to track the movement of molecules or matter near the photonic surface, it should be possible to design novel optical probes for measuring molecular displacements and forces. Simulating the near-field of an optical structure of known size and shape can be a routine task with current finite-difference time-domain (FDTD) techniques. However, experimentally mapping out the field in a real system can be extremely difficult. Two predominant approaches exist: (1) mechanically move a probe such as a near-field tip through the evanescent field in fine increments (<2 nm) and measure the intensity as a function of distance, or (2) deposit thin optically inactive layers and measure the signal of an optically active object as a function of spacer thickness. Using an probe such as a tapered optical fiber to quantitatively measure the optical intensity near a surface is very challenging since strong interferences can exist between the probe and surface which can obscure the true signal. In addition, the probe can change the local optical environment near the optical surface.

Figure 10A:
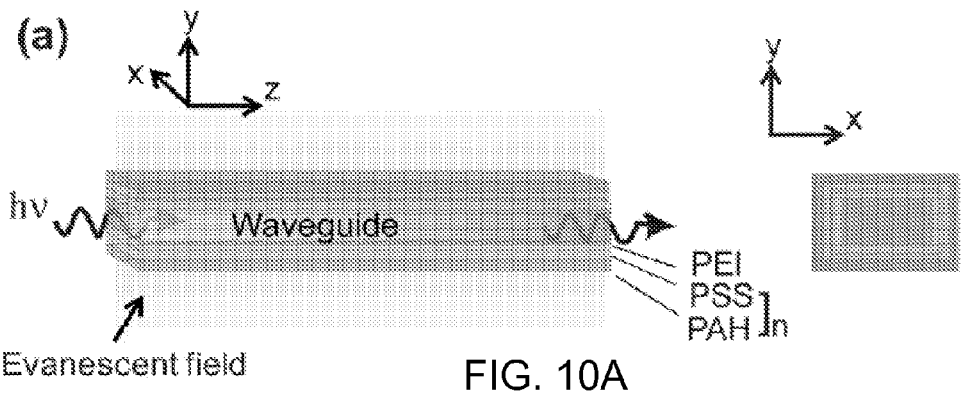
FIG. 10A shows a schematic of a $SnO_2$ optical fiber coated with polyelectrolyte layers from both a side-view (left) and cross-section (right) view in accordance with some embodiments described herein.

To reduce optical interference and allow optically active objects to be tested within the near-field, proposed mapping technique uses a layer-by-layer assembly of polyelectrolyte multilayer (PEM) coatings to incrementally move an optical structure or optical transmitter through the decaying optical field. FIG. 10A shows a schematic of a $SnO_2$ optical fiber coated with polyelectrolyte layers from both a side-view (left) and cross-section (right) view in accordance with some embodiments described herein. Note that one-dimensional nanowire waveguides (WGs) offer an excellent test platform for the PEMs because they are free-standing structures that can be easily integrated with microfluidics, can propagate light in highly confined cavities over large distances, and have tunable dimensions. Single-crystalline semiconductor tin dioxide ($SnO_2$) WGs (rectangular cross-sections of 100-300 nm) are chosen to carry out the initial evanescent field studies due to their large index of refraction (n=2.1, for visible wavelengths) and wide band gap ($E_g$=3.6 eV). However, the measurement techniques described herein are not limited to be used with above optical structures, and should be applicable to various types of optical structures including photonic crystal, plasmonic and dielectric.

Figure 10B:
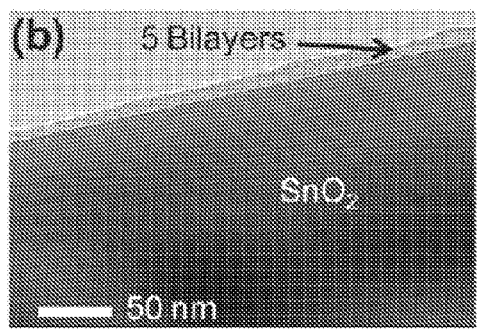
FIG. 10B shows transmission electron micrographs of a $SnO_2$WG with 5 polyelectrolyte bilayers in accordance with some embodiments described herein.
Figure 10C:
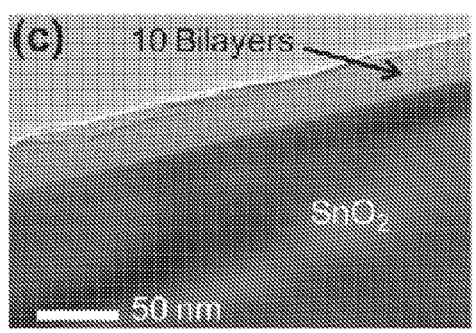
FIG. 10C shows transmission electron micrographs of a $SnO_2$WG with 10 polyelectrolyte bilayers in accordance with some embodiments described herein.
Figure 10D:
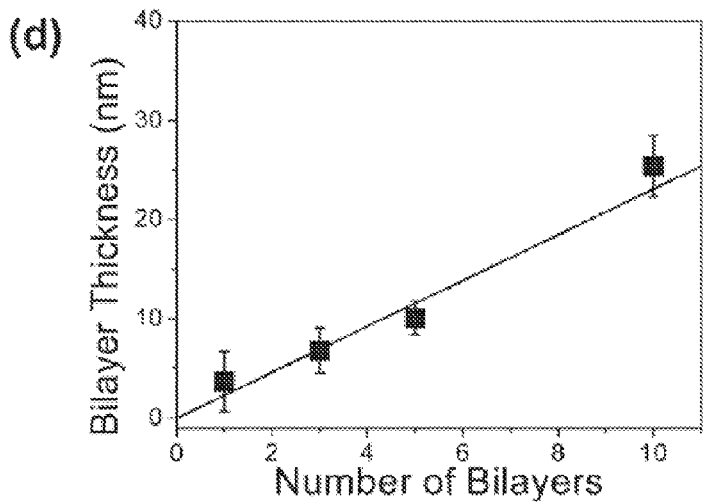
FIG. 10D shows polyelectrolyte thickness determined from TEM as a function of the number of layers in accordance with some embodiments described herein.

The PEM coatings can be ideal spacer layers because they are optically transparent, offer nanometer resolution in controlling the thickness of the film, and provide excellent contrast in direct imaging techniques (e.g., electron microscopy) which enables the coating thickness to be quantified with low measurement error. By controlling the polymer concentration, pH, and adsorption time, the thickness of the PEM can be finely tuned. The thickness per bilayer (positive and negative polyelectrolyte) is typically in the range of 2-3 nm, depending on the deposition conditions. FIG. 10B shows transmission electron micrographs of a $SnO_2$WG with 5 polyelectrolyte bilayers in accordance with some embodiments described herein. As evident in the transmission electron micrograph in FIG. 10B, which captures a 5 bilayer polystyrene sulfonate (PSS) and poly (allylamine hydrochloride) (PAH) film, the coatings are uniform and conformal using this self-assembly technique. FIG. 10C shows transmission electron micrographs of a $SnO_2$ WG with 10 polyelectrolyte bilayers in accordance with some embodiments described herein. The coating thickness in FIG. 10C was extracted from the TEM analysis. FIG. 10D shows polyelectrolyte thickness determined from TEM as a function of the number of layers in accordance with some embodiments described herein. The result agrees well with the ellipsometry data taken of PEMs on silicon substrates which gives a slope of 2.3 nm per bilayer.

Note that by tagging the final PAH layer with a fluorescent optical structure or optical transmitter such as fluorescein isothiocyanate (FITC), the system allows the optical field (via fluorescence intensity) to be quantified as a function of spacer thickness. FIG. 11A shows fluorescence (FL) images of FITC pumped with the evanescent field of a WG after depositing 3 (top) and 10 (bottom) PE bilayer spacers between the WG and final PAH-FITC layer in accordance with some embodiments described herein. In the top image in FIG. 11A, the cyan arrow indicates the propagation direction of the guided light ($\lambda$=442 nm). FIG. 11A captures the evanescently excited (442 nm light) fluorescence intensity of FITC with a spacer thickness of 3 and 10 bilayers. The waveguides may be suspended, e.g., across 50 mm channels to improve optical collection (i.e., eliminate substrate effects) and allow the PEM solutions to access the entire surface of the WG. FIG. 11B shows fluorescence intensities at 7 different locations along the WG used in FIG. 11A in accordance with some embodiments described herein. The results show only a small variation (<4%) in signal across the 50 mm channel. The fluorescence images also support the TEM results, which show similar fluorescent levels along the waveguide axis which indicates that the light propagates along the WG with ignorable losses and the polymer coatings are conformal and uniform.

FIG. 11C shows raw FITC fluorescence intensity as a function of PEM thickness in accordance with some embodiments described herein. The bimodal behavior indicates that the FITC signal is being quenched when the FITC is close to the SnO2 surface. The effects due to quenching and surface area are apparent in the fluorescent measurements. It has been shown that metal oxide surfaces such as $SnO_2$ surfaces can strongly quench the fluorescence of various molecules. We observe this in our system when the spacer thickness is less than 10 nm, but the data can be easily corrected for these effects as long as the quenching is monitored with epi-fluorescence simultaneously with the evanescent field measurements.

FIG. 11D shows FITC fluorescence (blue trace) collected under epi-illumination showing the increase in signal due to the decrease in the fluorescence quenching and increase in total surface area of the fiber (i.e., larger number of dye molecules) in accordance with some embodiments described herein. For comparison the normalized fiber surface area is plotted (red trace) vs. the PEM thickness. The fluorescence quenching dominates for dye-WG distances below 10 nm. Both the quenching and surface area effects were used to correct the fluorescence-based profiling data in FIG. 12. With a constant epi-illumination power, the data can be corrected by simply dividing the evanescent fluorescent signals (as in FIG. 11C) by the epi-fluorescence signals (as in FIG. 11D) from the same samples. Because the relative change in $|E|^2$ as a function of distance is the main concern, this strategy should be able to correct for the field intensity near any substrate.

The sharp decay in the optical intensity is quantified in FIG. 12 which shows a drop by ca. 60% going from 2 to 6 bilayers, or a spacer thickness of ~4 to 14 nm Compared to the FDTD simulations carried out on $SnO_2$ nanofibers with similar dimensions (cross-section of 200 nm×200 nm), which show a decay constant of 20 nm, the fluorescent mapping of $|E|^2$ produces a similar decay constant of 18.0±3.3 nm. Power dependent studies on the FITC, using excitation powers (<200 pW) that matched that of the evanescent field, did not show any two photon processes that could have altered the decay. The slight difference in the optical decays could be due to the small effective index change from the medium or polyelectrolyte film (n~1.45) which could decrease the V-parameter of the WG. The V-parameter of the optical fiber, $V=(\pi d(n_{co}^2-n_{cl}^2)^{1/2})/\lambda$ where d is diameter, $\lambda$, is wavelength, and $n_{co}$ and $n_{cl}$ are the index of refraction of the core and cladding, respectively, which describes the confinement of guided modes, would be different for each polyelectrolyte thickness, or medium, and could influence the emission of the dye molecule as the spacer thickness changes. However, FDTD studies show that the variation of the decay constant is extremely small (<5%) when the refractive index of the cladding is changed in a range (1.33 to 1.45) where most biological mediums exist.

Figure 12A:
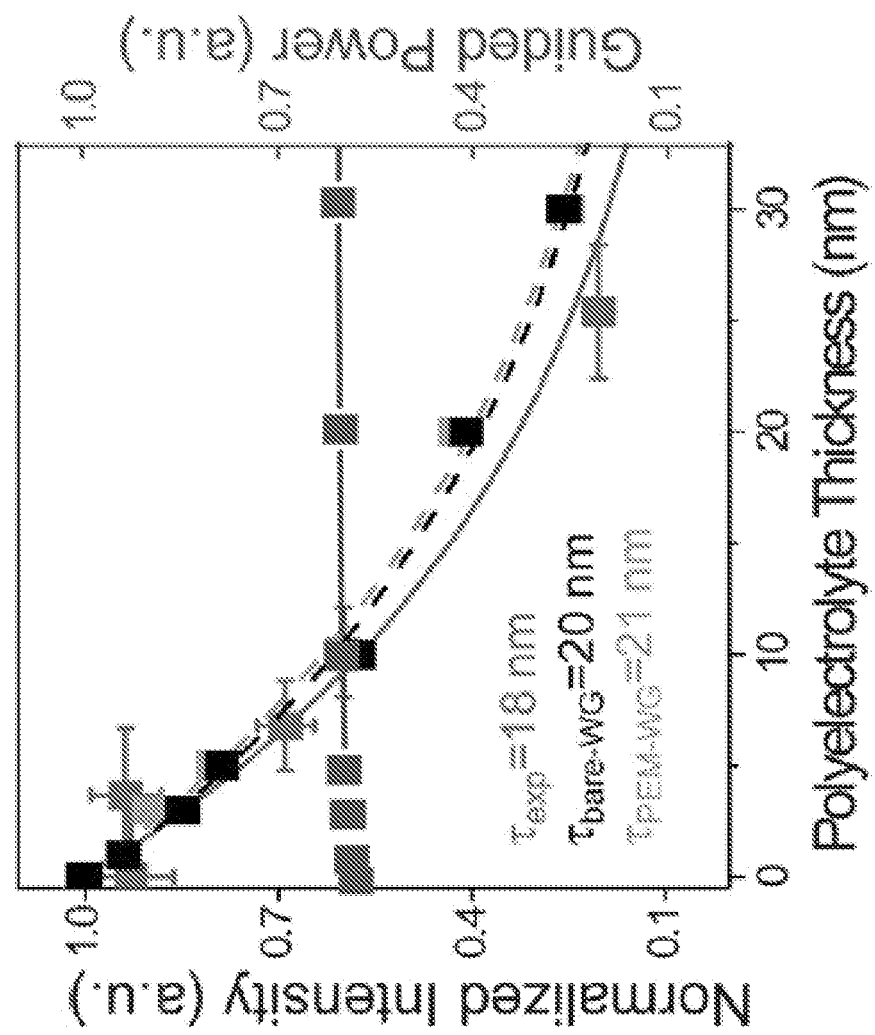
FIG. 12A shows near-field profiling data compiled from the results of the PEM experiments and 3D FDTD simulations in accordance with some embodiments described herein.
Figure 12B:
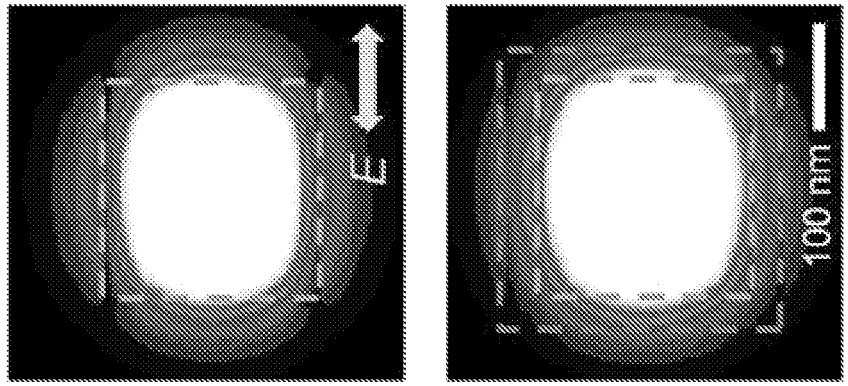
FIG. 12B shows power (time-averaged Poynting vector) distributions near the bare and PEM-coated WG in accordance with some embodiments described herein.

FIG. 12A shows near-field profiling data compiled from the results of the PEM experiments (red) and 3D FDTD simulations (green, black) in accordance with some embodiments described herein. Traces were fit to a first order exponential decay that gave the listed decay constants. The field intensity was monitored near the bare WG (black) and near a WG coated with PEMs of different thicknesses ranging from 0 to 30 nm (green). The total integrated power guided in the WG was also monitored as a function of PEM thickness, which shows only a ~6% change when the PEM coating thickness changed from 0 to 30 nm (blue trace). Additional experiments may be performed to fully understand cladding effects, but the strong correlation between the experimental and simulated results demonstrate how effective this technique can be at profiling the evanescent field. FIG. 12B shows power (time-averaged Poynting vector) distributions near the bare (top) and PEM-coated (30 nm) WG (bottom) in accordance with some embodiments described herein. The yellow arrow indicates the polarization of the guided 442 nm light. The green dashed box outlines the actual WG dimensions (200 nm×200 nm) used in the simulation, which are similar to those used in the experiments. The red dashed box outlines the 30 nm PEM deposited on the WG.

Note that a tunable, fast decaying, optical field may be used to measure distances with high resolution. This ability of measuring molecular-level distances and motion is a key component to techniques such as optical tweezers and atomic force microscopes (AFM), which use highly calibrated transducers to directly measure distances and forces. The use of light-matter interactions near a dielectric or metal surface to measure distance changes with sub-nanometer resolution provides a novel approach to developing fiber optic-based force transducers and sensors. Given the experimental decay data using a fluorescent optical structure or optical transmitter, a spatial resolution of 0.8±0.2 nm can be extracted for movements occurring perpendicular to the long axis of the fiber. In comparison to conventional force transducers such as optical traps (0.1 nm distance resolution) and AFMs (~0.5 nm distance resolution), the displacement sensitivity of the evanescent field is slightly lower using fluorescence, but can reach sub-nanometer regime need to monitor molecular movements. The data shown in FIG. 12 are obtained using an ensemble of fluorescent optical structures or optical transmitters. However, individual emitters can also be used including quantum dots or plasmonic nanoparticles. Profiling the near-field can be performed by using other optical structures or optical transmitters including metal nanoparticles and quantum dots, but the self-assembled cladding technique described herein may be applied to other optical systems and has been proven in this work using fluorescent feedback to be an extremely quantitative approach to mapping out a decaying optical field near a dielectric surface.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed are techniques and structures as described and shown, including:

1. An optical-mechanical force-sensing device, comprising:
    an optical waveguide operable to internally guide light;
    one or more compressible coatings formed on a surface of the optical waveguide, and configured to be substantially within an evanescent field of the guided light of the optical waveguide; and
        one or more optical structures attached to an external surface of the one or more compressible coatings in the evanescent field, wherein each of the one or more optical structures, having a size less than 100 nm thereby allowing detection of nanoscale forces, is configured to emit light based on an interaction with the evanescent field to indicate a displacement of the one or more optical structures relative to the surface of the optical waveguide caused by an external force exerted on the one or more optical structures;
        wherein prior to converting the measured intensity into the displacement of the one or more optical structures, a relationship between a scattering intensity by the one or more optical structures and a distance of the one or more optical structures relative to the surface of the optical waveguides is calibrated.

2. The force-sensing device of claim 1, further comprising: a first optical detector positioned in the far field of the emitted light and configured to measure an intensity of the emitted light from the one or more optical structures; and
    a computing mechanism configured to convert the measured intensity into the displacement of the one or more optical structures relative to the surface of the optical waveguide.

3. The force-sensing device of claim 2, wherein the first optical detector is configured to measure a total intensity of the emitted lights from the one or more optical structures; and
    wherein the computing mechanism is configured to convert the total intensity into the displacement of the one or more optical structures relative to the surface of the optical waveguide.

4. The force-sensing device of claim 3, further comprising:
    a conversion mechanism configured to convert the measured displacement into a force which causes the displacement of the one or more optical structures.

5. The force-sensing device of claim 2, wherein the first optical detector is configured to independently measure an intensity of the emitted light from each of the one or more optical structures.

6. The force-sensing device of claim 1, further comprising:
    a second optical detector positioned at the output end of the optical waveguide and configured to measure an intensity of the transmitted light through the optical waveguide;
    a computing mechanism configured to convert the measured intensity into the displacement of the one or more optical structures relative to the surface of the optical waveguide; and
    a conversion mechanism configured to convert the measured displacement into a force which causes the displacement of the one or more optical structures.

7. The force-sensing device of claim 1, wherein the one or more compressible coatings are configured to be compressed by the one or more optical structures when the one or more optical structures displace by a downward force exerted on the one or more optical structures.

8. The force-sensing device of claim 7, wherein the one or more compressible coatings are configured to restore shape when the downward force exerted on the one or more optical structures is reduced or removed.

9. The force-sensing device of claim 1, wherein the one or more compressible coatings are configured to be stretched when the one or more optical structures displace by an upward force exerted on the one or more optical structures.

10. The force-sensing device of claim 1, wherein the one or more compressible coatings are fully reversible in shape after being compressed or stretched.

11. The force-sensing device of claim 1, wherein the one or more compressible coatings are characterized by a stiffness.

12. The force-sensing device of claim 1, wherein the one or more compressible coatings are formed by a polymer material.

13. The force-sensing device of claim 12, wherein the polymer material includes a polyelectrolyte material.

14. The force-sensing device of claim 13, wherein the polyelectrolyte material is polyethyleneimine (PEI), polystyrene sulfonate (PSS), or poly(allylamine hydrochloride) (PAH).

15. The force-sensing device of claim 1, wherein the one or more optical structures include a plasmonic nanoparticle, which can include a gold nanoparticle, a silver nanoparticle, or other metallic nanoparticles.

16. The force-sensing device of claim 15, wherein the one or more optical structures include a quantum dot.

17. The force-sensing device of claim 15, wherein the plasmonic nanoparticle interacts with the evanescent field through a plasmon-dielectric coupling.

18. The force-sensing device of claim 15, wherein the wavelength of the guided light is selected to include a resonance waveguide of the plasmonic nanoparticle.

19. The force-sensing device of claim 1, wherein the one or more optical structures include a fluorescent molecule or particle, and wherein the fluorescent molecule or particle interacts with the evanescent field through a fluorescent interaction.

20. The force-sensing device of claim 1, wherein the optical waveguide includes a subwavelength optical fiber.

21. The force-sensing device of claim 1, wherein the subwavelength optical fiber is made of tin oxide ($SnO_2$).

22. The force-sensing device of claim 1, wherein the external force includes one of: an acoustic wave signal, strain, pressure, and chemical signals.

23. The force-sensing device of claim 1, wherein the optical force-sensing device has a displacement sensing resolution of about 1 angstrom.

24. The force-sensing device of claim 1, wherein the optical force-sensing device has a force sensing resolution of <100 femtonewtons.

25. The force-sensing device of claim 1, wherein the optical force-sensing device has a force sensing range from femtonewtons to nanonewtons.

26. The force-sensing device of claim 1, wherein the one or more compressible coatings have a total thickness less than 20 nm.

27. A method for making an optical-mechanical force-sensing device, comprising: forming one or more compressible coatings on a surface of an optical waveguide operable to internally guide light, wherein the one or more compressible coatings are substantially within an evanescent field range of a guided light of the optical waveguide; and attaching one or more optical structures to an external surface of the one or more compressible coatings, wherein each of the one or more optical structures, having a size less than 100 nm to enable detection of nanoscale forces, is configured to emit light based on an interaction with an evanescent field near the surface of the optical waveguide to indicate a displacement of the one or more optical structures relative to the surface of the optical waveguide caused by an external force exerted on the one or more optical structures, wherein the method further comprises calibrating a relationship between a scattering intensity by the one or more optical structures and a distance of the one or more optical structures relative to the surface of the optical waveguides.

28. The method of claim 27, wherein the one or more compressible coatings are configured to be compressed by the one or more optical structures when the one or more optical structures displace by a downward force exerted on the one or more optical structures.

29. The method of claim 27, wherein the one or more compressible coatings are configured to be stretched when the one or more optical structures displace by an upward force exerted on the one or more optical structures.

30. The method of claim 27, wherein the one or more compressible coatings are formed by a polymer material.

31. A method for performing an optical-mechanical force-sensing, comprising:
obtaining an optical sensor which comprises:
an optical waveguide operable to internally guide light;
one or more compressible coatings formed on a surface of the optical waveguide, and configured to be substantially within an evanescent field of the guided light of the optical waveguide;
and one or more optical structures attached to an external surface of the one or more compressible coatings in the evanescent field, wherein each of the one or more optical structures has a size less than 100 nm thereby enabling detection of nanoscale forces;
guiding a light through the optical waveguide to cause each of the one or more optical structures to emit light based on an interaction with an evanescent field near the surface of the optical waveguide;
determining a displacement of the one or more optical structures relative to the surface of the optical waveguide caused by an external force exerted on the one or more optical structures;
converting the determined displacement into a force which causes the displacement of the one or more optical structures; and
calibrating a relationship between a scattering intensity by the one or more optical structures and a distance of the one or more optical structures relative to the surface of the optical waveguides.

32. The method of claim 31, wherein determining the displacement of the one or more optical structures involves:
measuring an intensity of the emitted light from the one or more optical structures in the far field of the emitted light;
converting the measured intensity into the displacement of the one or more optical structures relative to the surface of the optical waveguides.

33. The method of claim 32, wherein determining the displacement of the one or more optical structures involves:
measuring a total intensity of the emitted lights from the one or more optical structures; and
converting the total intensity into the displacement of the one or more optical structures relative to the surface of the optical waveguide.

34. The method of claim 31, wherein determining the displacement of the one or more optical structures involves independently measuring an intensity of the emitted light from each of the one or more optical structures.

35. The method of claim 31, wherein determining the displacement of the one or more optical structures involves:
measuring an intensity of the transmitted light through the optical waveguide at the output end of the optical waveguide;
converting the measured intensity into the displacement of the one or more optical structures relative to the surface of the optical waveguides.

36. The method of claim 31, wherein prior to converting the determined displacement into the force which causes the displacement of the one or more optical structures, the method further comprises calibrating a relationship between the displacement of the one or more optical structures and an external force exerted on the one or more optical structures based on mechanical properties of the one or more compressible coats.

37. The method of claim 31, wherein the one or more optical structures include a plasmonic nanoparticle.

38. The method of claim 37, wherein the plasmonic nanoparticle interacts with the evanescent field through a plasmon-dielectric coupling.

39. The method of claim 37, wherein the method further comprises selecting a wavelength of the guided light to include a resonance waveguide of the plasmonic nanoparticle.

40. The method of claim 31, wherein the one or more optical structures include a fluorescent molecule or particle, and wherein the fluorescent molecule or particle interacts with the evanescent field through a fluorescent interaction.

41. The method of claim 31, wherein the external force includes one of: an acoustic wave signal, strain, pressure, cell and chemical signals.

* * * * *